United States Patent
Yamagishi et al.

(10) Patent No.: US 10,742,339 B2
(45) Date of Patent: Aug. 11, 2020

(54) RECEIVING DEVICE, TRANSMITTING DEVICE, AND DATA PROCESSING METHOD

(71) Applicant: Saturn Licensing LLC, New York, NY (US)

(72) Inventors: Yasuaki Yamagishi, Kanagawa (JP); Tatsuya Igarashi, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 16/310,561

(22) PCT Filed: Jul. 11, 2017

(86) PCT No.: PCT/JP2017/025256
§ 371 (c)(1),
(2) Date: Dec. 17, 2018

(87) PCT Pub. No.: WO2018/021015
PCT Pub. Date: Feb. 1, 2018

(65) Prior Publication Data
US 2019/0190633 A1 Jun. 20, 2019

(30) Foreign Application Priority Data
Jul. 25, 2016 (JP) .................................. 2016-145101

(51) Int. Cl.
*H04H 20/91* (2008.01)
*H04H 60/13* (2008.01)
(Continued)

(52) U.S. Cl.
CPC ............ *H04H 20/91* (2013.01); *H04H 60/13* (2013.01); *H04N 21/23617* (2013.01);
(Continued)

(58) Field of Classification Search
None
See application file for complete search history.

(56) References Cited

U.S. PATENT DOCUMENTS

2006/0026142 A1  2/2006 Ohmori et al.
2008/0056299 A1  3/2008 Kim et al.
(Continued)

FOREIGN PATENT DOCUMENTS

EP  2 728 896 A1  5/2014
EP  2 908 539 A1  8/2015
(Continued)

OTHER PUBLICATIONS

Extended European Search Report dated Apr. 26, 2019 in corresponding European Patent Application No. 17834023.8 citing documents AA, AB, AO and AP therein, 9 pages.
(Continued)

*Primary Examiner* — James R Marandi
(74) *Attorney, Agent, or Firm* — Oblon, McClelland, Maier & Neustadt, L.L.P.

(57) ABSTRACT

The present technology relates to a receiving device, a transmitting device, and a data processing method that can flexibly control operation of an application associated with content. Effective period information indicating a period in which an application associated with content can specify one of a first mode for controlling operation of the application according to the period and a second mode for controlling the operation of the application according to intention of an end user and, in a case where the second mode is specified as the effective period information, the operation of the application is controlled in response to an operation by the end user. The present technology can be applied to a television receiver or the like, which can receive terrestrial broadcast, for example.

20 Claims, 14 Drawing Sheets

(51) Int. Cl.
    *H04N 21/236*     (2011.01)
    *H04N 21/462*     (2011.01)
    *H04N 21/61*     (2011.01)
    *H04N 21/81*     (2011.01)
    *H04N 21/472*     (2011.01)

(52) U.S. Cl.
    CPC ....... *H04N 21/462* (2013.01); *H04N 21/4622* (2013.01); *H04N 21/472* (2013.01); *H04N 21/6112* (2013.01); *H04N 21/6125* (2013.01); *H04N 21/8173* (2013.01)

(56) References Cited

U.S. PATENT DOCUMENTS

| | | |
|---|---|---|
| 2010/0107181 A1 | 4/2010 | Kim et al. |
| 2014/0173665 A1 | 6/2014 | Kitazato et al. |
| 2015/0281805 A1 | 10/2015 | Kitazato |

FOREIGN PATENT DOCUMENTS

| | | |
|---|---|---|
| JP | 2001-292427 A | 10/2001 |
| JP | 2006-50105 A | 2/2006 |
| JP | 2015-119286 A | 6/2015 |
| JP | 2015-180065 A | 10/2015 |
| JP | 2016-103745 A | 6/2016 |

OTHER PUBLICATIONS

International Search Report dated Oct. 10, 2017 in PCT/JP2017/025256 filed on Jul. 11, 2017.

FIG. 5

| Element or Attribute Name | | | | | Use | Data Type | Description |
|---|---|---|---|---|---|---|---|
| bundleDescription | | | | | | | Root element of The User Service Bundle Description. |
| | userServiceDescription | | | | | | A single instance of an ATSC 3.0 Service. |
| | | @globalServiceID | | | 0..1 | anyURI | A globally unique URI that identifies the ATSC 3.0 Service. |
| | | @serviceId | | | 1 | unsignedShort | Reference to corresponding service entry in the (SLT). |
| | | @serviceStatus | | | 0..1 | boolean | Specify the status of this service as active or inactive. |
| | | @fullMPDUri | | | 1 | anyURI | Reference to an MPD fragment that contains descriptions for content components of the ATSC 3.0 Service delivered over broadcast and/or broadband. |
| | | @sTSIDUri | | | 1 | anyURI | Reference to the S-TSID fragment which provides access related parameters for the Transport sessions carrying contents of this ATSC 3.0 Service. |
| | | @hlstUri | | | 1 | anyURI | Reference to the HLST fragment. |
| | | name | | | 0..N | string | Name of the ATSC 3.0 service. |
| | | | @lang | | 1 | language | Language of the ATSC 3.0 service name. |
| | | serviceLanguage | | | 0..N | language | Available languages of the ATSC 3.0 service. |
| | | deliveryMethod | | | 1..N | | Container of transport-related information pertaining to the contents of the service over broadcast and (optionally) broadband modes of access. |
| | | | @apdUri | | 0..1 | anyURI | Reference to the APD fragment which contains file repair related information. |
| | | | broadcastAppService | | 0..N | | A DASH Representation delivered over broadcast containing the corresponding media component(s) belonging to the ATSC 3.0 Service. |
| | | | | basePattern | 1..N | string | A character pattern for use by the ATSC receiver to match against any portion of the Segment URL used by the DASH client to request Media Segments of a parent Representation. |
| | | | unicastAppService | | 0..N | | A DASH Representation delivered over broadband containing the constituent media content component(s) belonging to the ATSC 3.0 Service. |
| | | | | basePattern | 1..N | string | A character pattern for use by the ATSC receiver to match against any portion of the Segment URL used by the DASH client to request Media Segments of a parent Representation. |

FIG. 6

| Element or Attribute Name | | | | Use | Data Type | Description |
|---|---|---|---|---|---|---|
| HLST | | | | 1 | | Includes HTML entry page collection elements. |
| | HTMLEntryPage | | | 1..N | | Contains properties of Entry page. |
| | | @requiredCapabilities | | 0..1 | string | Device capabilities needed for meaningful rendition of the entry page(as defined in the A/332 "Service Announcement" [xx]) |
| | | @linearSvcEnabling | | 0..1 | boolean | Indicates that the broadcaster requests that the broadcaster application will be responsible for rendering video on the Service. |
| | | @coupledServices | | 0..1 | string | Provides a comma-separated list of linear services sharing a common broadcaster app. |
| | | EntryLocation | | 1 | | Information about one HTML entry location |
| | | | entryURL | 1 | anyURI | The URL path component to the entry point of HTML pages.. |
| | | | alternateEntryURL | 0..1 | anyURI | An alternate path to the same HTML pages as indicated in @entryURL |
| | | | @validFrom | 0..1 | dateTime | Indicates that the app at EntryURL is valid from this date and time. |
| | | | @validUntil | 0..1 | dateTime | Indicates that app at EntryURL is obsolete at this date and time. |
| | | | DistribtuionWindow | 0..1 | | Container for distribution window. |
| | | | | StartTime | 1 | unsignedInt | Start time indicated by 32 bit integer part of NTP time stamp. |
| | | | | EndTime | 1 | unsignedInt | End time indicated by 32 bit integer part of NTP time stamp. |

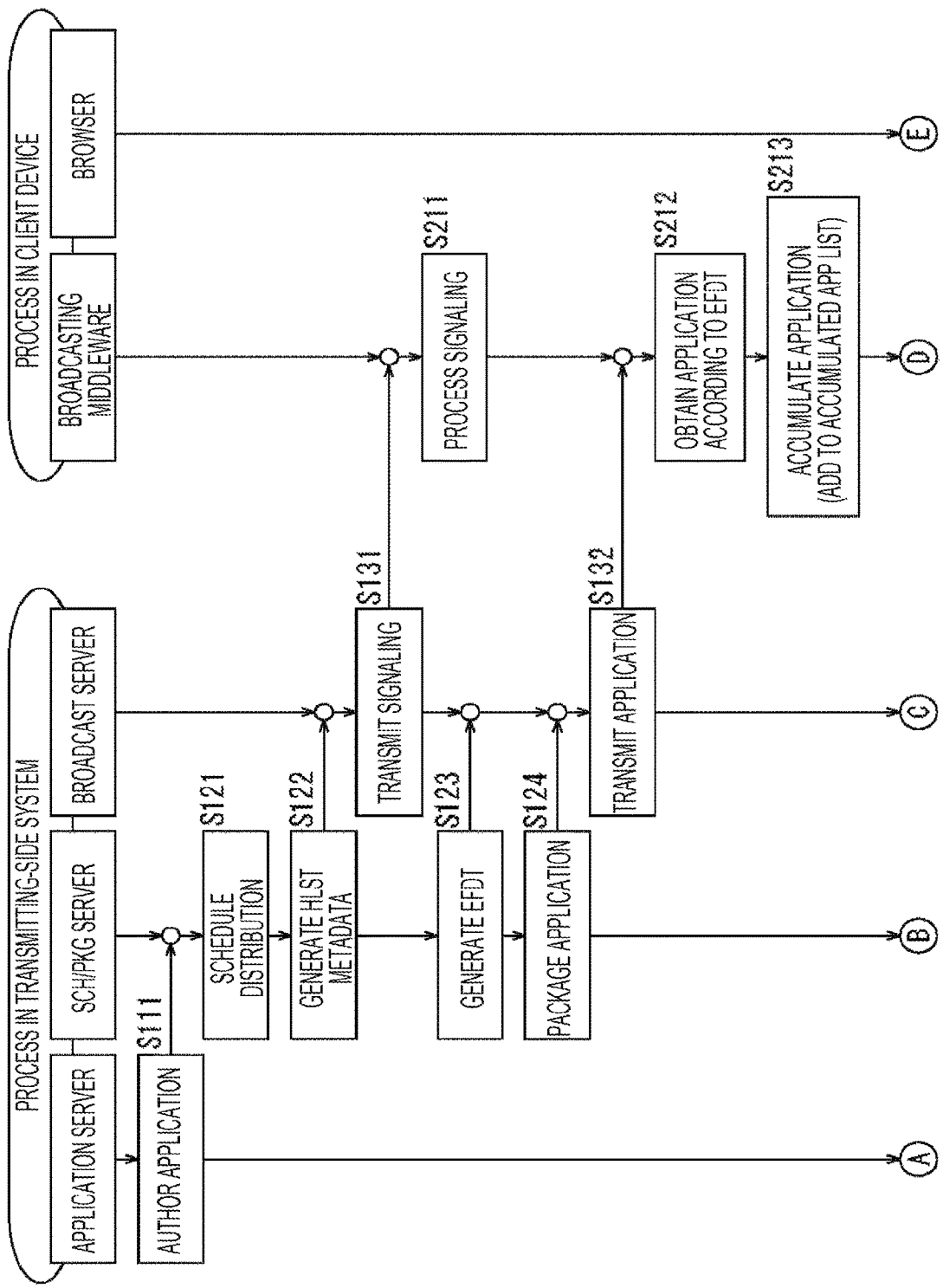

FIG. 11

RECEIVING DEVICE, TRANSMITTING DEVICE, AND DATA PROCESSING METHOD

TECHNICAL FIELD

The present technology relates to a receiving device, a transmitting device, and a data processing method and, more particularly, relates to a receiving device, a transmitting device, and a data processing method, which can further flexibly control operation of an application associated with content.

BACKGROUND ART

It is known that application control information of an application information table (AIT) and the like is used in a distribution life cycle control of an application associated with content such as a program, a commercial, and the like (hereinafter, also simply referred to as the application) (see Patent Document 1, for example). Using the application control information, the receiver can control operation of activating and ending the application.

CITATION LIST

Patent Document

Patent Document 1: Japanese Patent Application Laid-Open No. 2015-180065

SUMMARY OF THE INVENTION

Problems to be Solved by the Invention

Here, since the AIT controls a life cycle of the application on the basis of transmitting timing in a transmitting side and is not flexible enough to control the operation of the application according to intention of an end user. Therefore, a proposal for more flexible control of the operation of the application has been demanded.

The present technology has been made in view of the above situation and realizes further flexible control of operation of an application associated with content.

Solutions to Problems

A receiving device of a first aspect of the present technology includes a receiving unit configured to receive content, and a control unit configured to control operation of an application associated with the content on the basis of effective period information indicating a period in which the application becomes effective. The effective period information can specify one of a first mode for controlling operation of the application according to the period and a second mode for controlling the operation of the application according to intention of an end user, and the control unit controls the operation of the application in response to an operation by the end user in a case where the second mode is specified as the effective period information.

The receiving device according to the first aspect of the present technology may be an independent device or may be an inner block composing a single device. Furthermore, a data processing method according to the first aspect of the present technology is a data processing method compliant with the above described receiving device according to the first aspect of the present technology.

In the receiving device and data processing method according to the first aspect of the present technology, the content is received and the operation of the application is controlled on the basis of the effective period information indicating the period in which the application associated with the content becomes effective. Furthermore, the effective period information can specify the first mode for controlling the operation of the application according to the period and the second mode for controlling the operation of the application according to intention of the end user and, in a case where the second mode is specified as the effective period information, the operation of the application is controlled in response to the operation by the end user.

A transmitting device according to a second aspect of the present technology includes a generating unit configured to generate effective period information which indicates a period in which an application associated with content becomes effective and can specify one of a first mode for controlling operation of the application according to the period and a second mode for controlling the operation of the application according to intention of an end user, and a transmitting unit configured to transmit the effective period information together with the content.

The transmitting device according to the second aspect of the present technology may be an independent device or may be an internal block composing a single device. Furthermore, a data processing method according to the second aspect of the present technology is a data processing method compliant with the above described transmitting device according to the second aspect of the present technology.

In the transmitting device and data processing method according to the second aspect of the present technology, the effective period information, which is the period that the application associated with the content becomes effective and can specify one of the first mode for controlling the operation of the application according to the period and the second mode for controlling the operation of the application according to intention of the user, is generated and the effective period information is transmitted together with the content.

Effects of the Invention

According to the first aspect and second aspect of the present technology, operation of the application associated with the content can be controlled more flexibly.

Note that effects described here should not be limited and may be any one of the effects described in the present disclosure.

BRIEF DESCRIPTION OF DRAWINGS

FIG. 5 is a diagram illustrating an example of a format of USBD metadata.

FIG. 6 is a diagram illustrating an example of a format of HLST metadata.

FIG. 7 is a flowchart explaining a flow of an application corresponding process.

FIG. 11 is a diagram illustrating a display example of icons for activating the application.

MODE FOR CARRYING OUT THE INVENTION

Figure 1:
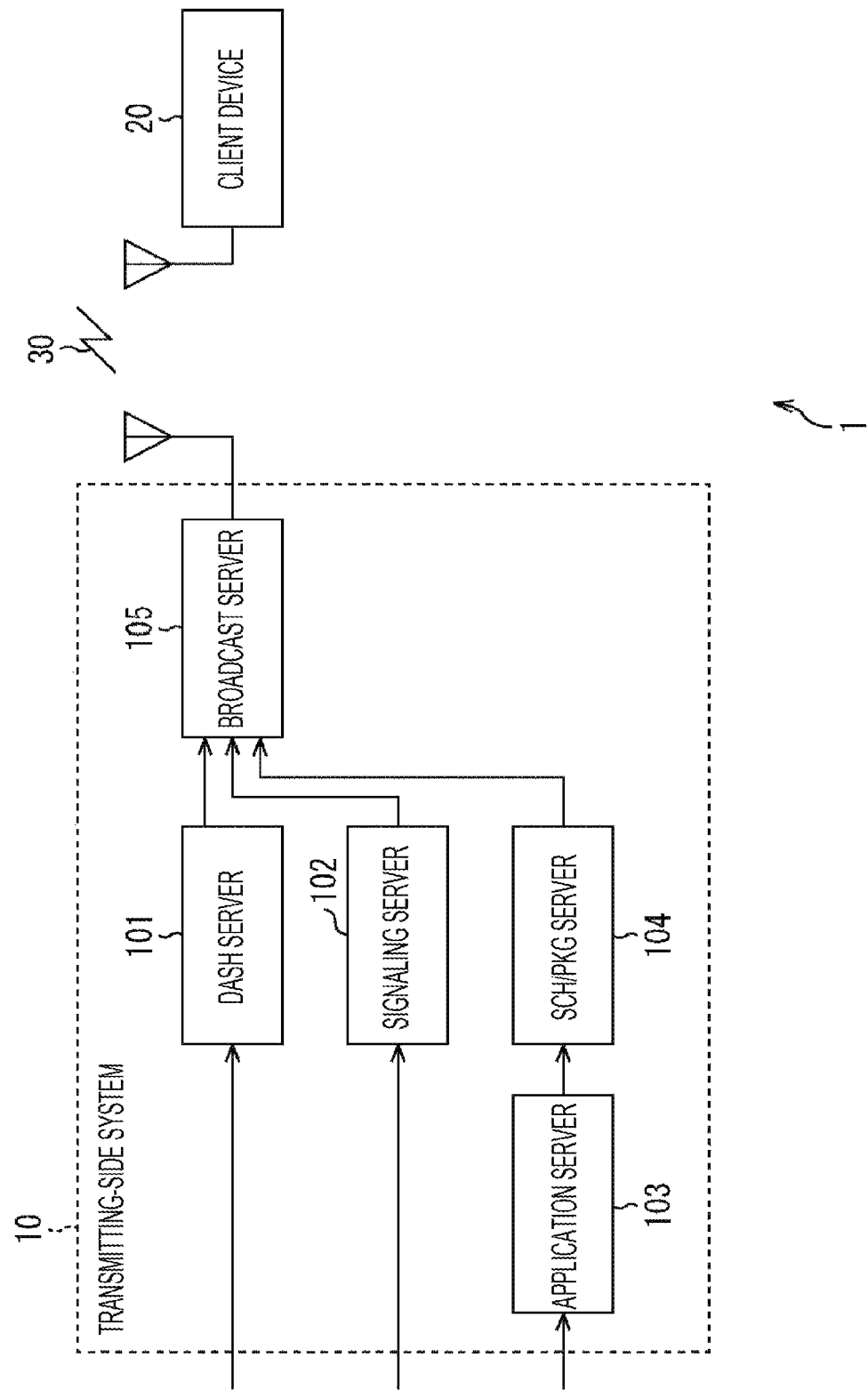
FIG. 1 is a diagram illustrating a configuration example of an embodiment of a transmission system to which the present technology is applied.

In the following, an embodiment of the present technology will be described with reference to the drawings. Note that the description will be given in the following order.
1. System configuration
2. Outline of the present technology
3. Details of signaling
4. Flow of processes executed in each device
5. Modification example
6. Configuration of computer 1. System Configuration (Configuration of Transmission System)

FIG. 1 is a diagram illustrating a configuration example of an embodiment of a transmission system to which the present technology is applied. Note that the system represents an aggregation in which a plurality of devices are logically aggregated.

In FIG. 1, the transmission system 1 includes a transmitting-side system 10 and a client device 20 in a receiving side. In the transmission system 1, data transmitted from the transmitting-side system 10 is received by the client device 20 via a broadcasting transmission path 30.

For example, in the transmission system 1, data transmission compliant with a predetermined standard of currently formulated Advanced Television Systems Committee (ATSC) 3.0 or the like, which is a next generation broadcasting standard in the United State of America.

The transmitting-side system 10 performs a process for transmitting transmission data compliant with a predetermined standard. The transmitting-side system 10 includes a DASH server 101, a signaling server 102, an application server 103, a SCH/PKG server 104, and a broadcast server 105.

The DASH server 101 is a server for performing distribution service compliant with Dynamic Adaptive Streaming over HTTP (MPEG-DASH). The DASH server 101 receives data of content from outside. The DASH server 101 generates a file of DASH segment of content such as a program, a commercial, and the like on the basis of the data from outside and transmits the file to the broadcast server 105.

The signaling server 102 receives, from outside, data for generating signaling. The signaling server 102 generates a file of signaling on the basis of the data from outside and transmits the file to the broadcast server 105.

The application server 103 receives, from outside, data to generate an application. The application server 103 generates a file of an application on the basis of the data from the outside and transmits the file to the SCH/PKG server 104.

Note that the application is an application associated with content such as a program or a commercial. For example, as such an application, an application developed using a markup language including HyperText Markup Language 5 (HTML5) and the like or a script language including JavaScript (registered trademark) and the like can be used.

The SCH/PKG server 104 determines a distribution schedule of a file (package file), which composes the application. Furthermore, the SCH/PKG server 104 generates a package file of the application and application control information (later described HLST metadata) according to the distribution schedule and transmits the package file and application control information to the broadcast server 105.

Note that, the package file includes, for example, an entry page file such as an HTML document file and a resource file such as an image file, and a script file, and the like.

The broadcast server 105 receives the file of the DASH segment from the DASH server 101, the file of signaling from the signaling server 102, and the file of the application (package file) from the SCH/PKG server 104. The broadcast server 105 processes the files of the DASH segment, signaling, and application, and transmits a multiplexed stream obtained as a result to the broadcasting transmission path 30 as a broadcast wave.

Note that the application control information (later described HLST metadata) from the SCH/PKG server 104 is included as signaling in the multiplexed stream.

The client device 20 is a receiver that can receive transmission data compliant with a predetermined standard. For example, the client device 20 is a fixed receiver such as a television receiver, a set-top box (STB), and the like or a mobile receiver such as a smartphone, a cell phone, a tablet-type computer, and the like. Furthermore, the client device 20 may be a device installed in a vehicle, such as a vehicle television set, for example. Note that a detail configuration of the client device 20 will be described later with reference to FIG. 2.

The client device 20 receives the broadcast wave transmitted from the broadcasting transmission path 30 via the broadcast server 105, and generates video or audio of the content such as a program, a commercial, and the like by extracting and processing data including the files of the DASH segment or signaling from the multiplexed stream included in the broadcast wave.

Furthermore, by processing the file of the application transmitted from the broadcast server 105, the client device 20 can activate (execute) the application associated with the content which is being reproduced. Here, the application operates without being displayed (in the background) in some cases, in addition to clearly displaying some information (may be activated without being recognized by the end user).

Note that, in the transmission system 1, the broadcasting transmission path 30 may be, for example, satellite broadcasting using a broadcasting satellite (BS) or a communications satellite (CS), wire broadcasting (CATV) using a cable, or the like, in addition to the ground wave (terrestrial broadcast).

Furthermore, in transmission system 1 of FIG. 1, to simplify the description, a single client device 20 is illustrated; however, there may be more than one client devices 20, and the broadcast wave transmitted by the transmitting-side system 10 (simultaneous multiple address distribution) can be simultaneously received by the plurality of client device 20 via the broadcasting transmission path 30.

Furthermore, there may be more than one transmitting-side systems 10. In each of the plurality of transmitting-side systems 10, a broadcast wave including a multiplexed stream is transmitted using separate frequency bands as separate service (channel), for example, and, in the client device 20, service that the multiplexed stream is received can be selected (channel selection) from each service (channels) of the plurality of transmitting-side systems 10.

(Configuration of Client Device)

Figure 2:
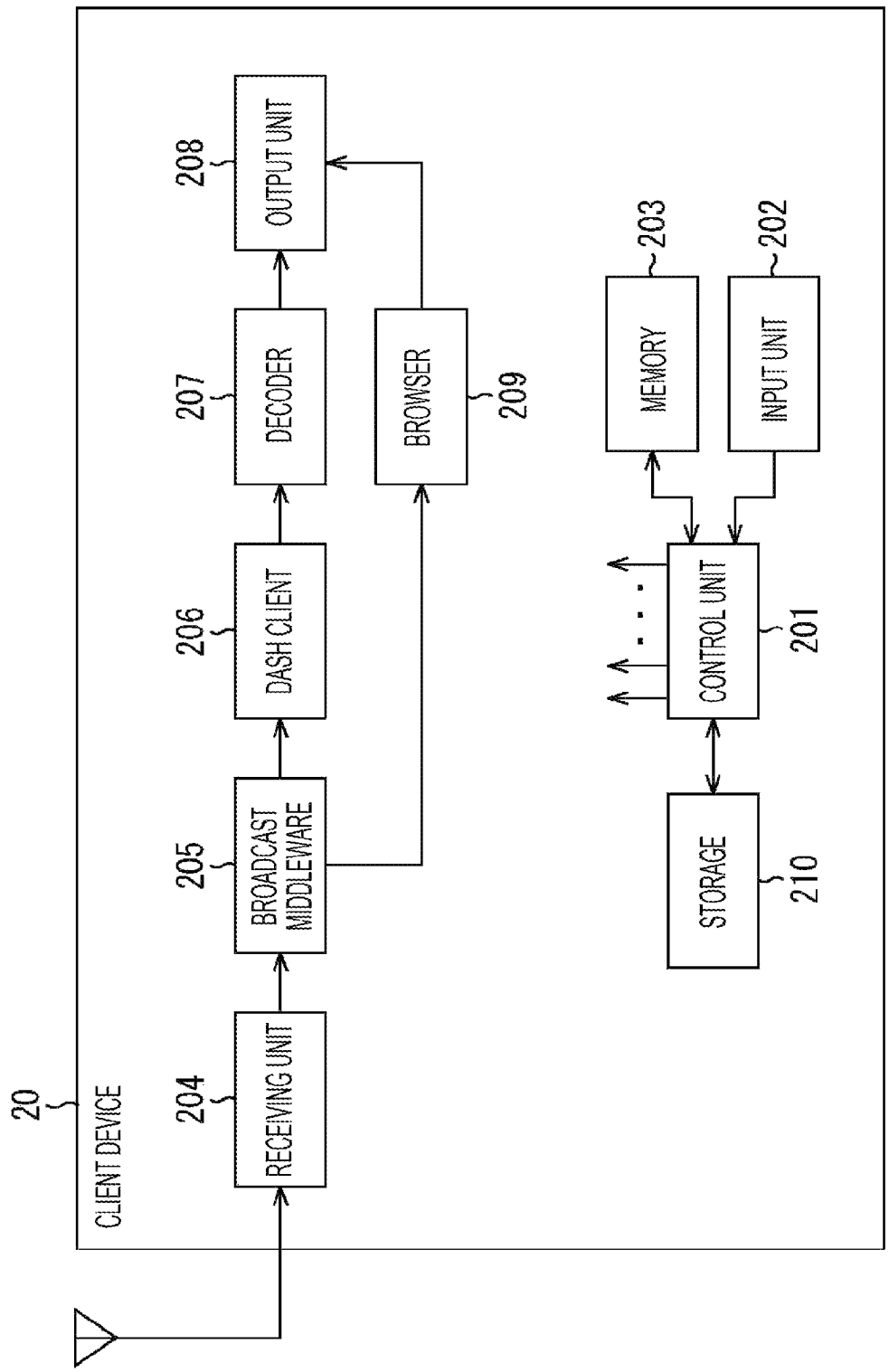
FIG. 2 is a diagram illustrating a configuration example of a client device.

FIG. 2 is a diagram illustrating a configuration example of the client device 20 of FIG. 1.

In FIG. 2, the client device 20 includes a control unit 201, an input unit 202, a memory 203, a receiving unit 204, a broadcast middleware 205, a DASH client 206, a decoder 207, an output unit 208, a browser 209, and a storage 210.

The control unit 201 includes a central processing unit (CPU), a microprocessor, or the like, for example. The control unit 201 controls operation of each unit in the client device 20.

The input unit 202 includes an input interface circuit or the like, for example. The input unit 202 supplies an operation signal corresponding to operation by the end user to the control unit 201. The control unit 201 controls operation of each unit on the basis of the operation signal from the input unit 202.

The memory 203 includes a semiconductor memory such as a non-volatile RAM (NVRAM) and the like, for example. The memory 203 stores various data according to the control by the control unit 201.

The receiving unit 204 includes a tuner, a demodulator, or the like, for example. The receiving unit 204 performs a modulation process on the broadcast wave received via an antenna and supplies a multiplexed stream obtained as a result to the broadcast middleware 205.

According to the control by the control unit 201, the broadcast middleware 205 processes the multiplexed stream supplied from the receiving unit 204 and supplies data obtained as a result to the DASH client 206 or browser 209.

Here, from the data to be processed, the DASH segment file is supplied to the DASH client 206 and the file of the application (package file) is supplied to the browser 209. Furthermore, in the data to be processed, the file of the signaling is processed by the control unit 201 and broadcast middleware 205.

According the control by the control unit 201, the DASH client 206 processes the DASH segment file supplied from the broadcast middleware 205 and supplies data of video or audio obtained as a result to the decoder 207.

The decoder 207 includes a decoder circuit or the like, for example. The decoder 207 decodes the data supplied from the DASH client 206 according to a predetermined decoding scheme and supplies data of video or audio obtained as a result to the output unit 208.

The output unit 208 includes an output interface circuit or the like, for example. The output unit 208 processes the data supplied from the decoder 207 and outputs the data to a display, a speaker, and the like. With this arrangement, in the client device 20, the content is reproduced and the video or audio are output.

The browser 209 is, for example, a browser compliant with HTML5. According to the control by the control unit 201, the browser 209 processes the file of the application (package file) supplied from the broadcast middleware 205 and supplies data obtained as a result to the output unit 208.

The output unit 208 processes data supplied from the browser 209 and outputs the data to a display or the like. With this arrangement, in the client device 20, video of the application is displayed ancillary to the video of the content.

The storage 210 is, for example, a large capacity storage device such as a hard disk drive (HDD), a semiconductor memory, or the like. According to the control by the control unit 201, the storage 210 stores various data.

Note that, in the client device 20 of FIG. 2, (the entire or a part of) the functions of the broadcast middleware 205, DASH client 206, and browser 209 can be realized, for example, by that the control unit 201 including a CPU executes a predetermined program stored in the memory 203. Furthermore, the functions of the DASH client 206 and decoder 207 and a function of rendering may be included in the browser 209.

Furthermore, in FIG. 2, the client device 20 may include a display such as a liquid crystal display (LCD), an organic electroluminescence display (OELD), and the like and a speaker, so that the video and audio corresponding to the data from the output unit 208 may be output or the data from the output unit 208 may be output to an external display or an external speaker.

2. Outline of the Present Technology

According to the present technology, more advanced service can be provided by introducing, as the data transmission scheme, an IP transmission scheme in which an Internet Protocol (IP) packet used in a field of communication is applied for digital broadcasting, instead of MPEG2-Transport Stream (TS) scheme, which has been widely used these days. Note that it has been considered to employ the IP transmission scheme in ATSC 3.0, which is one of the next generation broadcasting standards.

(Protocol Stack According to the Present Technology)

Figure 3:
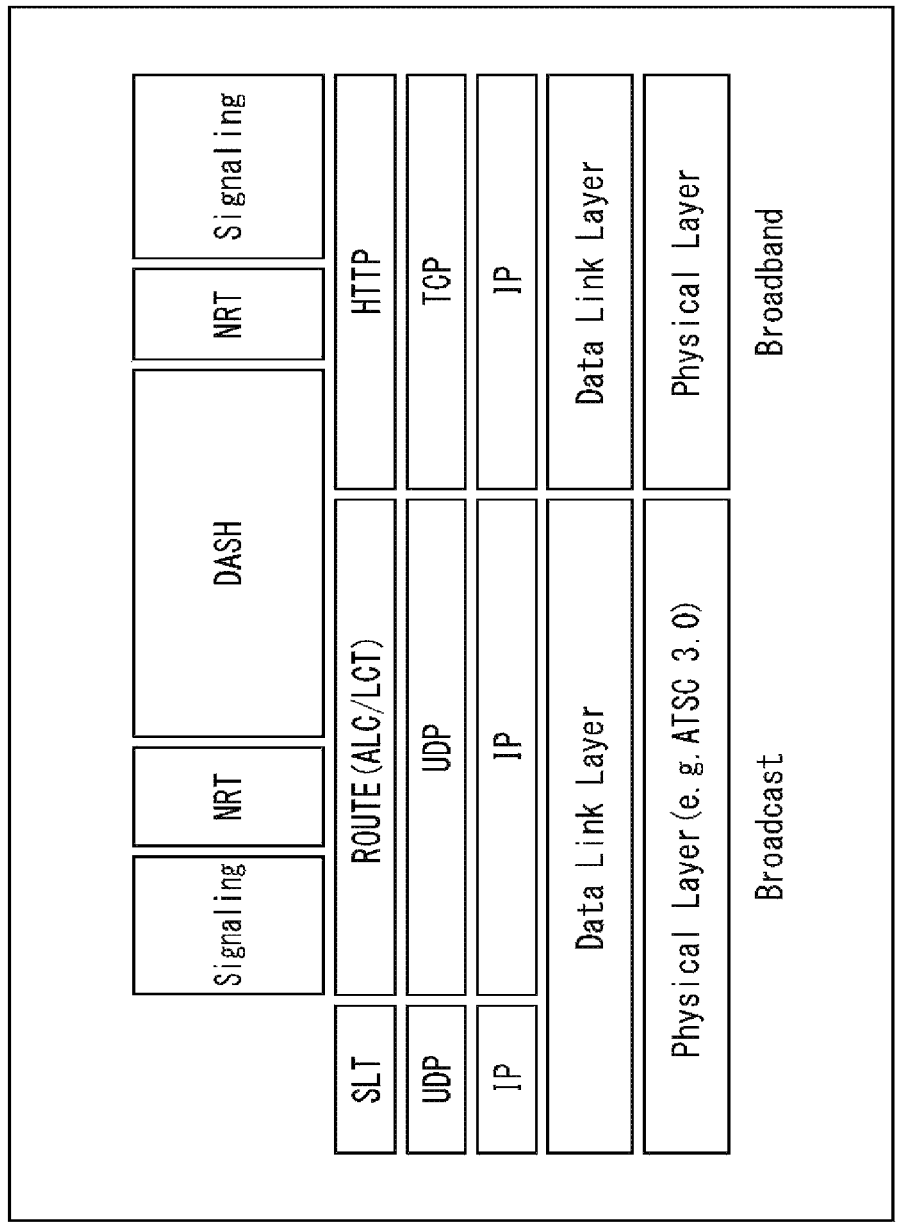
FIG. 3 is a diagram illustrating a configuration example of a protocol stack according to the present technology.

FIG. 3 is a diagram illustrating an example of a protocol stack of the IP transmission scheme according to the present technology.

In FIG. 3, the lowest layer is considered as a physical layer. In digital broadcasting using an IP transmission scheme such as ATSC 3.0 and the like, there is a case where a part of data is transmitted using bidirectional communication in addition to transmission using one-way broadcasting and, in a case where broadcasting is used, a frequency band of a broadcast wave allocated for service (channel) is applied to the physical layer.

An upper layer of the physical layer is considered as a data link layer. Furthermore, upper layers of the data link layer are considered as an Internet Protocol (IP) layer and a user datagram protocol (UDP) layer. The IP layer and UDP layer are layers corresponding to a network layer and a transport layer of a communication layer model, and an IP packet and a UDP packet are specified on the basis of an IP address and a port number.

Here, in ATSC 3.0, it is assumed that low level signaling (LLS) and service layer signaling (SLS) are used as signaling. LLS is signaling transmitted in a layer lower than the layer of SLS. SLS is service-based signaling. In other words, in ATSC 3.0, signaling of the transport layer is transmitted in two layers of LLS and SLS.

LLS is stored and transmitted in a UDP/IP packet. LLS includes metadata such a service list table (SLT) and the like. SLT metadata includes basic information, which indicates a configuration of a stream or service in a broadcasting network, such as information necessary to select service (channel) and the like. The SLT metadata is transmitted as being included in a UDP/IP packet, which is an IP packet including a UDP packet. Here, the UDP/IP packet storing the SLT metadata are transmitted using a dedicated IP address and a port number.

An upper layer adjacent to the IP layer and UDP layer is considered as a real-time object delivery over unidirectional transport (ROUTE). ROUTE is a protocol for transferring a streaming file and an expansion of file delivery over unidirectional transport (FLUTE).

Using this ROUTE session, for each service, an SLS file (signaling), a non real time (NRT) content file (NRT), a DASH segment file (DASH), and the like are transmitted.

Here, SLS is signaling of a service level and provides information, property, and the like necessary to search or select a component of target service. SLS includes metadata such as user service bundle description (USED), service-based transport session instance description (S-TSID), HTML pages entry location signaling table (HLST), media presentation description (MPD), and the like.

USBD metadata includes information such as an acquisition source of another piece of metadata and the like. Note that details of the USED metadata will be described later with reference to FIG. 5.

S-TSID metadata is an expansion of LCT session instance description (LSID) to be compliant with ATSC 3.0, and is control information of ROUTE protocol. Furthermore, the S-TSID metadata can specify extended FDT (EFDT) transmitted in the ROUTE session. EFDT is an expansion of a file delivery table (FDT) introduced in FLUTE and is control information for transferring.

HLST metadata is control information for controlling an activation (operation) of an application associated with content. Note that details of the HLST metadata will be described later with reference to FIG. 6.

MPD metadata is control information of a file of video or audio, which is used to perform streaming distribution compliant with MPEG-DASH. Here, MPEG-DASH is a streaming distribution standard based on over the top video (OTT-V) and is a standard related to adaptive streaming distribution using a streaming protocol based on Hypertext Transfer Protocol (HTTP).

In the standard of MPEG-DASH, a manifest file for writing metadata, which is control information of the file of video or audio and a file format for transmitting content of a moving image are defined. Here, the former manifest file is referred to as a media presentation description (MPD) and the later file format is referred to as a segment format.

Furthermore, in a case where ROUTE is used as a transport protocol, an MP4 file format can be used as a file format for streaming. The MP4 file format is a derived format of an ISO base media file format (ISO BMFF) defined in ISO/IEC 14496-12.

A segment transmitted in a ROUTE session includes an initialization segment (IS) and a media segment (MS). The initialization segment includes initialization information of a data compression scheme, or the like. Furthermore, the media segment stores data of a stream of video, audio, and captions. In other words, the media segment corresponds to a DASH segment (DASH segment file).

In this manner, stream data of a service component (video, audio, captions, and the like) which composes content of a program and the like is transmitted by the ROUTE session in units of DASH segment according to ISO BMFF standard.

Note that the NRT content is reproduced after being temporarily stored in a storage of a receiver. Furthermore, a file other than the NRT content (for example, a file of an application or an electronic service guide (ESG)) may be transmitted by ROUTE session.

Furthermore, SLT metadata as LLS, USBD as SLS, and metadata of S-TSID, HLST, MPD, and the like can be made as data in a text format written in a markup language of Extensible Markup Language (XML), and the like, for example.

On the other hand, in a case where bidirectional communication (broadband) is used, an upper layer of the physical layer is considered as a data link layer. Furthermore, an upper layer of the data link layer is considered as an IP layer corresponding to a network layer. An upper layer adjacent to the IP layer is considered as a transmission control protocol (TCP) layer corresponding to a transport layer, and further, an upper layer adjacent to the TCP layer is considered as an HTTP layer corresponding to an application layer.

In other words, with these layers, a protocol such as TCP/IP that works in a communication line such as the Internet and the like (for example, a later described communication transmission path 40 (FIG. 13)) is mounted.

A part of the upper layers adjacent to the HTTP layer is considered as signaling (Signaling) and NRT content (NRT). As the signaling, all signaling including signaling transmitted by the above described ROUTE session or the like is included. Furthermore, the NRT content is content obtained via communication and, for example, an application is included.

A layer other than the above described layers in the upper layers adjacent to the HTTP layer are considered as a DASH segment (DASH). In other words, in the streaming distribution of a bidirectional communication system, stream data of a service component (video, audio, captions, and the like), which composes a video on demand (VOD) program and the like is transmitted in units of DASH segments compliant with ISO BMFF standard.

As described above, in a protocol stack of the IP transmission scheme according to the present technology, a part of a layer for one-way broadcasting and a layer for bidirectional communication serves as a common protocol, and stream data of a service component composing content can be transmitted in units of DASH segments compliant with the ISO BMFF standard by one-way broadcasting and bidirectional communication.

Therefore, in a case where both of streaming distribution in one-way broadcasting and streaming distribution in bidirectional communication are performed, since protocols of the upper layers are used in common, for example, a load of mounting and a load of processing can be reduced in the broadcast server 105 and client device 20.

(Relationship Between Signaling and Transmission Files)

Figure 4:
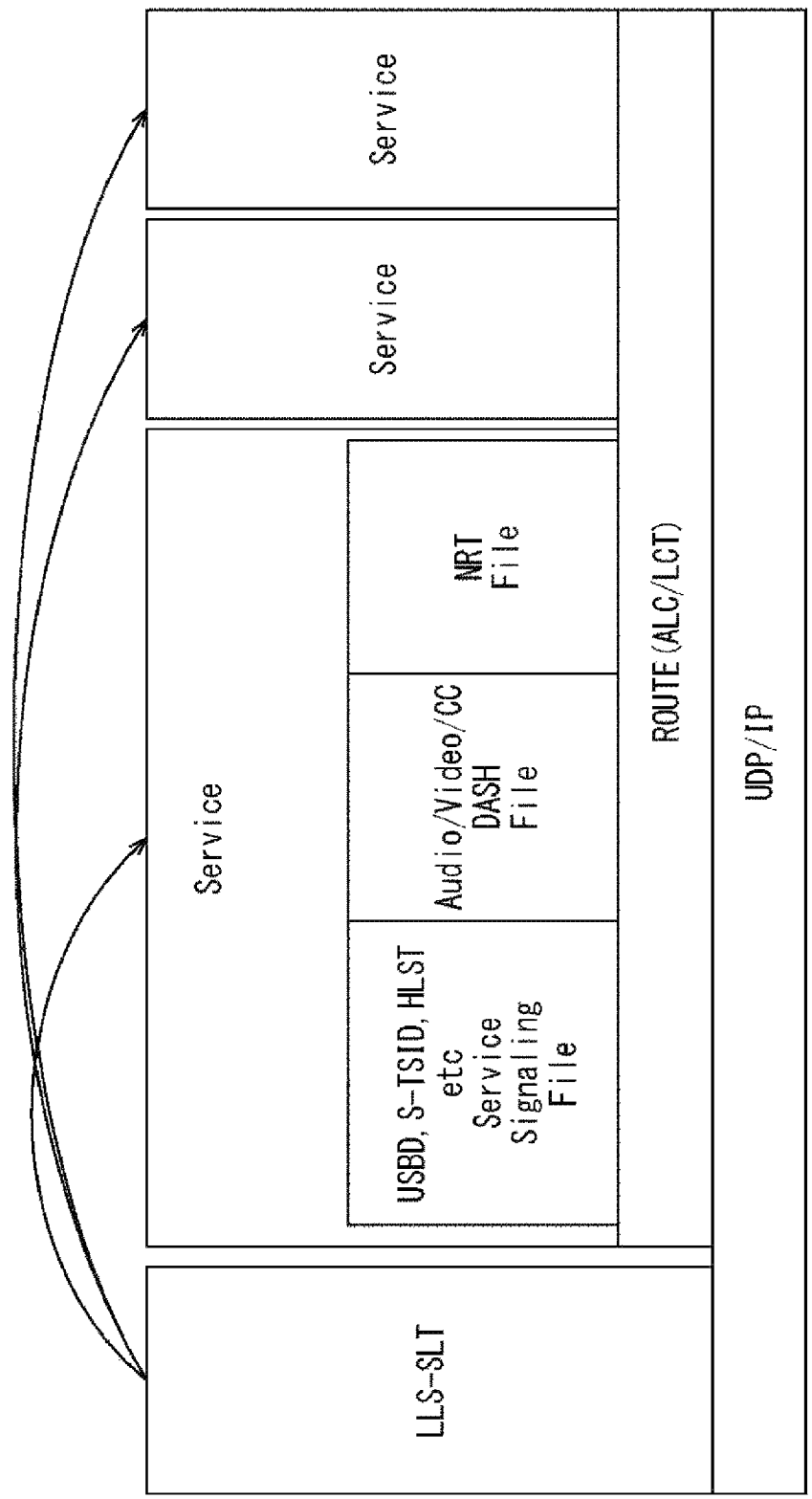
FIG. 4 is a diagram illustrating a relationship between signaling and transmission files.

FIG. 4 is a diagram illustrating a relationship between signaling and transmission files.

As illustrated in FIG. 4, in the client device 20, (a file of) SLT metadata transmitted as LLS is obtained prior to SLS. Then, in a case where the end user performs a channel selection or the like, the client device 20 obtains (a file of) SLS metadata transmitted in units of service on the basis of the SLT metadata obtained in advance.

In other words, in an SLS channel of the ROUTE session, metadata of USBD, S-TSID, HLST, and the like is transmitted. In the client device 20, by obtaining USBD metadata prior to another piece of metadata transmitted by the SLS channel, S-TSID metadata and HLST metadata are obtained according to information (URL) indicating an acquisition source of the another piece of data written in the USBD metadata.

Furthermore, in the ROUTE session, one of LCT channels (sessions) written in the S-TSID metadata is allocated to transferring of NRT, which is a non-real time content, as the NRT channel. Furthermore, in the NRT channel, a transfer control parameter of files to be transferred in the channel is written by EFDT.

The client device 20 can obtain a package file transmitted by the NRT channel of the ROUTE session according to a transfer control parameter of EFDT. In the package file, files composing an application associated with the content is included. For example, in the package file, a file of an entry page of an HTML document file and the like and a resource file of an image file, a script file, and the like are stored.

Here, the HLST metadata is a table to inform an activation of the application. The HLST metadata adds effective period information (validFrom property and validUntil property of EntryLocation element in FIG. 6) of the application added to the content in which the HLST metadata itself is transmitted, and there is a proposal to add a period in which the application becomes available as acquisition period information (DistributionWindow element in FIG. 6).

In general, the period indicated by the DistributionWindow element is expected to be within the time of a same program; however, it may be made that the acquisition period written in the DistributionWindow element can be specified to be a time zone different from the program in which the target HLST metadata (this midnight, for example) and the like and can be used as a function of scheduled download in a time zone outside the program.

For example, in a case that time of a following day is allowed to be specified as a period which can be specified by validFrom property and validUntil property, regarding serial drama of a regularly broadcast series of drama programs, an application assumed to be used "tomorrow" of a program series broadcast tomorrow in the same time zone as today's time zone, can be broadcast tonight and obtained by the client device 20.

However, the current HLST metadata is not flexible enough to activate, reproduce, or stop the application distributed in a time zone during a program or before and after the program according to intention of the end user, in a time zone regardless of the program that the end user desires to reproduce.

In other words, for example, in a case where the client device 20 serves as a movie receiver such as a smartphone, tablet-type computer, and the like, since activation control entry independent from the program such as an application executed by the movie receiver cannot be defined, a proposal for controlling operation of an application more flexibly has been demanded.

Here, according to the present technology, the application can be operated according to an operation by the end user, by setting a mode to the HLST metadata so that the operation of the application can be controlled according to intention of the end user.

In other words, according to the above described example, in a case of a program of serial drama of a regularly broadcast series of drama, which is broadcast everyday at the same time, for example, the effective period (validFrom property and validUntil property and EntryLocation element) of the application specified by HLST metadata specifies the same time zone in a following day and in general, the target application is immediately discarded when the effective period passes.

On the other hand, according to the present technology, the mode may be set so that, by specifying a particular keyword such as " " to validFrom property of EntryLocation element for example, the operation of the application can be controlled according to intention of the end user, without immediately deleting the target application even when the effective period is passed.

In other words, in a case where "*" is specified to validFrom property of EntryLocation element of the HLST metadata, the application associated with the content can be used like a so-called install application and the deletion of the application is performed according to intention of the end user.

On the contrary, in a case where a future time before or after the program time is specified by DistributionWindow element (StartTime element and EndTime element) without specifying anything to the validFrom property and EntryLocation element, the application is obtained in an acquisition period specified in the DistributionWindow element.

Then, the control (activation or stop) of the operation of the application is performed by HLST metadata having a value of the same EntryLocation element in pieces of HLST metadata newly and sequentially transmitted (transmitted sometime later in near future). Here, differently from the case where "*" is specified to validFrom property of EntryLocation element, it can be instructed that control of operation of the application does not depend on intention of the end user.

Furthermore, in a case where DistributionWindow element is not specified in the HLST metadata, it is assumed that the target application is being transmitted while the HLST metadata is being transmitted and the target application is obtained at any timing by the client device 20.

Furthermore, in a case where validFrom property and validUntil property of EntryLocation element is not specified in the HLST metadata, timing of operation (activation, reproduction, and stop) of the target application is timing described as follows, for example. In other words, it is assumed to be specified by values of validFrom property and validUntil property of EntryLocation element of HLST metadata having a value of the same EntryLocation element in HLST metadata which is newly and subsequently transmitted later or the like.

Note that it is assumed that, in the HLST metadata, "*" is initially specified in validUntil property and EntryLocation element. In other words, this is to avoid that, even when the target application whose validFrom property and validUntil property of EntryLocation element is not specified is scheduled and distributed on the basis of the specification of DistributionWindow element, if a chance to select the same service one more time is missed for example, the target HLST metadata is never obtained and the control of operation of the application is never performed.

In other words, in a case where "*" is specified to validUntil property of EntryLocation element, this means that there is a mode that the application can be deleted according to intention of the end user or a mode that the application can be freely deleted according to a decision by the client device 20.

3. Details of Signaling

Next, with reference to FIGS. 5 and 6, structures of USED metadata and HLST metadata from SLS transmitted by the ROUTE session will be described.

(Example of a Structure of USBD Metadata)

FIG. 5 is a diagram illustrating an example of a format of the USED metadata.

Note that, in FIG. 5, of the element and property, "@" is attached to the property. Furthermore, it is assumed that the indented element and property are specified to an upper element. These relationships are similar in later described FIG. 6.

The bundleDescription element is a root element and is an upper element of the userServiceDescription element.

The userServiceDescription element is an upper element of the globalServiceID property, serviceId property, serviceStatus property, fullMPDUri property, sTSIDUri property, hlstUri property, name element, serviceLanguage element, and deliveryMethod element.

In the globalServiceID property, a global service ID is specified. In the serviceId property, a service ID is specified. In the serviceStatus property, information related to a status of service is specified.

In the fullMPDUri property, Uniform Resource Identifier (URI) for referring to the MPD metadata is specified. In the sTSIDUri property, a URI for referring to the S-TSID metadata is specified. In the hlstUri property, a URI for referring to the HLST metadata is specified.

In the name element, a name of ATSC 3.0 service is specified. The name element is an upper element of the lang property. In the lang property, a language of the name of ATSC 3.0 service is specified. In the serviceLanguage element, a language, which can be used in the ATSC 3.0 service, is specified.

In the deliveryMethod element, information related to data delivery method is specified. The deliveryMethod element is an upper element of the apdUri property, broadcastAppService element, and unicastAppService element.

In the apdUri property, a URI indicating a reference is specified in a case where associated procedure description (APD) metadata is transmitted as SLS.

The broadcastAppService element is an upper element of the basePattern element and information related to distribution by broadcasting is specified. The unicastAppService element is an upper element of the basePattern element and information related to distribution by broadcasting is specified.

Note that, regarding the details of the USBD metadata, the details are described in following Non-Patent Document 1, "Table 7.1 Semantics of the User Service Bundle Description Fragment for ROUTE/DASH".

Non-Patent Document 1: ATSC Candidate Standard: Signaling, Delivery, Synchronization, and Error Protection(A/331) Doc. S33-174r15 Jan. 2016

(Example of Structure of HLST Metadata)

FIG. 6 is a diagram illustrating an example of a format of HLST metadata.

The HLST element is a root element of the HTMLEntryPage element.

The HTMLEntryPage element includes a property of an entry page in an HTML format. The HTMLEntryPage element is an upper element of the requiredCapabilities property, linearSvcEnabling property, coupledServices property, and EntryLocation element.

In the requiredCapabilities property, information for determining whether or not a function of the client device 20 matches with a function needed to process the entry page is specified.

In the linearSvcEnabling property, information related to a requirement of a case where the application renders video data is specified. In the coupledServices property, information related to service that shares the application is specified.

In the EntryLocation element, information related to an entry location is specified. The EntryLocation element is an upper element of the entryURL element, alternateentryURL element, validFrom property, validUntil property, and DistributionWindow element.

In the entryURL element, a uniform resource locator (URL) indicating an entry point of the application is specified. In the alternateentryURL element, an alternative path of (an HTML page of) the application is specified.

In the validFrom property, start time information indicating start time of a period in which (the n HTML page of) the application becomes effective. In the start time information, timing to start displaying (the HTML page of) the application is specified with date and time (in a dateTime format).

In the validUntil property, end time information indicating time of ending the period in which (the HTML page of) the application is specified. In the end time information, timing to end displaying (the HTML page of) the application is specified with date and time (a dateTime format).

In other words, in EntryLocation element, a period in which (the HTML page of) the application associated with the content becomes effective (effective period) is specified by the start time specified by the validFrom property and the end time specified by the validUntil property.

Here, in a case where a certain keyword is specified in the validFrom property, it becomes a mode in which the operation of the target application can be controlled according to intention of the end user. In this case, an operation such as activating, stopping, deleting, and the like of the application depends on intention of the end user, and the application added to the content can be used like an installed application.

As the certain keyword specified in the validFrom property, for example, a particular symbol such as "*" (asterisk) or the like can be used. Here, since a data type of the validFrom property and validUntil property is in the dateTime format, a value indicating "*" is defined like "9999-12-31 23:59:59.999" for example. Furthermore, it may be understood that, in the validUntil property, a certain keyword such as "*" is specified by default.

In the DistributionWindow element, information related to a distribution schedule of the application is specified. The DistributionWindow element is an upper element of the StartTime element and EndTime element.

In the StartTime element, start time information indicating time to start a distribution period of the application is specified. In the EndTime element, end time information indicating time to end the distribution period of the application is specified. In the StartTime element and EndTime element, for example, an integer part of 32 bits of a time stamp of Network Time Protocol (NTP) can be specified.

In other words, in the DistributionWindow element, a period in which the application is distributed (available period) is specified with the start time specified by the StartTime element and the end timed specified by the EndTime element.

The HLST metadata composed as described above can be information to add a single application to single content.

For example, since the HLST metadata is associated with an application and a program one by one so that the HLST metadata can be easily obtained by the client device 20 prior to the associated program, and this results in that the associated application can be activated within the effective period indicated by the HLST metadata. Thus, the HLST metadata, program, and application can be collectively handled and processed without receiving an effect from another program or application, which is reproduced before or after thereof.

Note that, since an AIT, which is known as application control information controls a life cycle of the application using timing of transmission thereof, chronological continuity is needed. Thus, in a case where the AIT is used, for example, a transient process such as ending an application prior to the current executed application or the like to activate the target application for example is needed and it is needed to manage a process of the program and overall control of the application by the AIT in the broadcaster side so that the management becomes complicated. On the other hand, according to the present technology, since a single piece of HLST metadata is made independent with no relationship with another application and another program, management thereof becomes easier in the broadcaster side and, as a result, operation of the application can be controlled easily.

Note that, in FIGS. 5 and 6, regarding the item of "Use", in a case where "1" is specified, the single element or a single property is always specified and, in a case where "1 . . . N" is specified, one or more of the element or property is specified. Furthermore, as "Cardinality", "0 . . . 1" is specified, it is optional whether to specify the element or property, and in a case where "0 . . . N" is specified, it is optional whether or not to specify one or more of the element and property.

Furthermore, regarding the item of "Data Type", in a case where "anyURI" is specified, the element or property expresses a character string in a URL format and, in a case where "unsignedShort" or "unsignedInt" is specified, it is indicated that a value or the element or property is an integer type. Furthermore, in a case where "boolean" is specified, it is indicated that the element or property is in a boolean datatype and, in a case where "string" is specified, the value of the element or property is in a character string format. Furthermore, in a case where "dateTime" is specified, it is indicated that the element or property expresses particular date and time.

Note that the above described formats of the USBD metadata and HLST metadata in FIGS. 5 and 6 are examples and, for example, another format instead of an XML format may be used. Furthermore, the USBD metadata and HLST metadata are not limited to the text format and may be in a binary format.

4. Flow of Processes Executed in Each Device

Next, with reference to FIGS. 7 to 12, a flow of processes executed in the transmitting-side system 10 and client device 20 in the transmission system 1 of FIG. 1 will be described.

In the transmission system 1 of FIG. 1, data to be processed in the transmitting-side system 10 and client device 20 is mainly data related to the content and data related to the application. Then, in this example, an application corresponding process focusing on a process on data related to the application is firstly described with reference to FIGS. 7 to 11, and then a content corresponding process focusing on a process on data related to the content will be described with reference to FIG. 12.

(Application Corresponding Process)

Firstly, with reference to flowcharts in FIGS. 7 and 8, a flow of the application corresponding process executed in the transmitting-side system 10 and client device 20 will be described.

The process in step S111 of FIG. 7 is executed by the application server 103 (FIG. 1).

In step S111, the application server 103 performs an authoring process on an application and generates (a file of) the application. The application generated by the application server 103 is transmitted to the SCH/PKG server 104.

In this authoring process, an application including a group of files such as an entry page file, one or more resource files, and the like is generated. For example, in a case where the application is developed using HTML5 or JavaScript (registered trademark), the entry page file is an HTML document file or the like and the resource file is an image file, a script file, or the like.

The processes in steps S121 to S124 in FIG. 7 are executed by the SCH/PKG server 104 (FIG. 1). In the SCH/PKG server 104, (the file of) the application generated by the application server 103 is received.

In step S121, the SCH/PKG server 104 performs a distribution scheduling process of the group of files composing the application and determines a distribution schedule.

In step S122, the SCH/PKG server 104 generates HLST metadata according to the distribution schedule determined in the process in step S121. The HLST metadata generated by the SCH/PKG server 104 is transmitted to the broadcast server 105.

In step S123, the SCH/PKG server 104 generates an EFDT according to the distribution schedule determined in the process in step S121. The EFDT generated by the SCH/PKG server 104 is transmitted to the broadcast server 105.

In step S124, the SCH/PKG server 104 performs a packaging process of the group of files composing the application generated by the application server 103 and generates a package file. The package file of the application generated by the SCH/PKG server 104 is transmitted to the broadcast server 105.

In this packaging process, for example, an entry page file such as an HTML document file and the like and a resource file such as an image file, a script file, and the like are packaged and a package file is generated.

The processes in steps S131 to S132 in FIG. 7 are executed by the broadcast server 105 (FIG. 1). In the broadcast server 105, the HLST metadata, EFDT, and package file and the application generated by the SCH/PKG server 104 are received.

In step S131, the broadcast server 105 processes signaling including the HLST metadata generated by the SCH/PKG server 104 and transmits the data as a broadcast wave via the broadcasting transmission path 30.

In step S132, the broadcast server 105 processes the EFDT and package file of the application generated by the SCH/PKG server 104 and transmits the data as a broadcast wave via the broadcasting transmission path 30.

Figure 8:
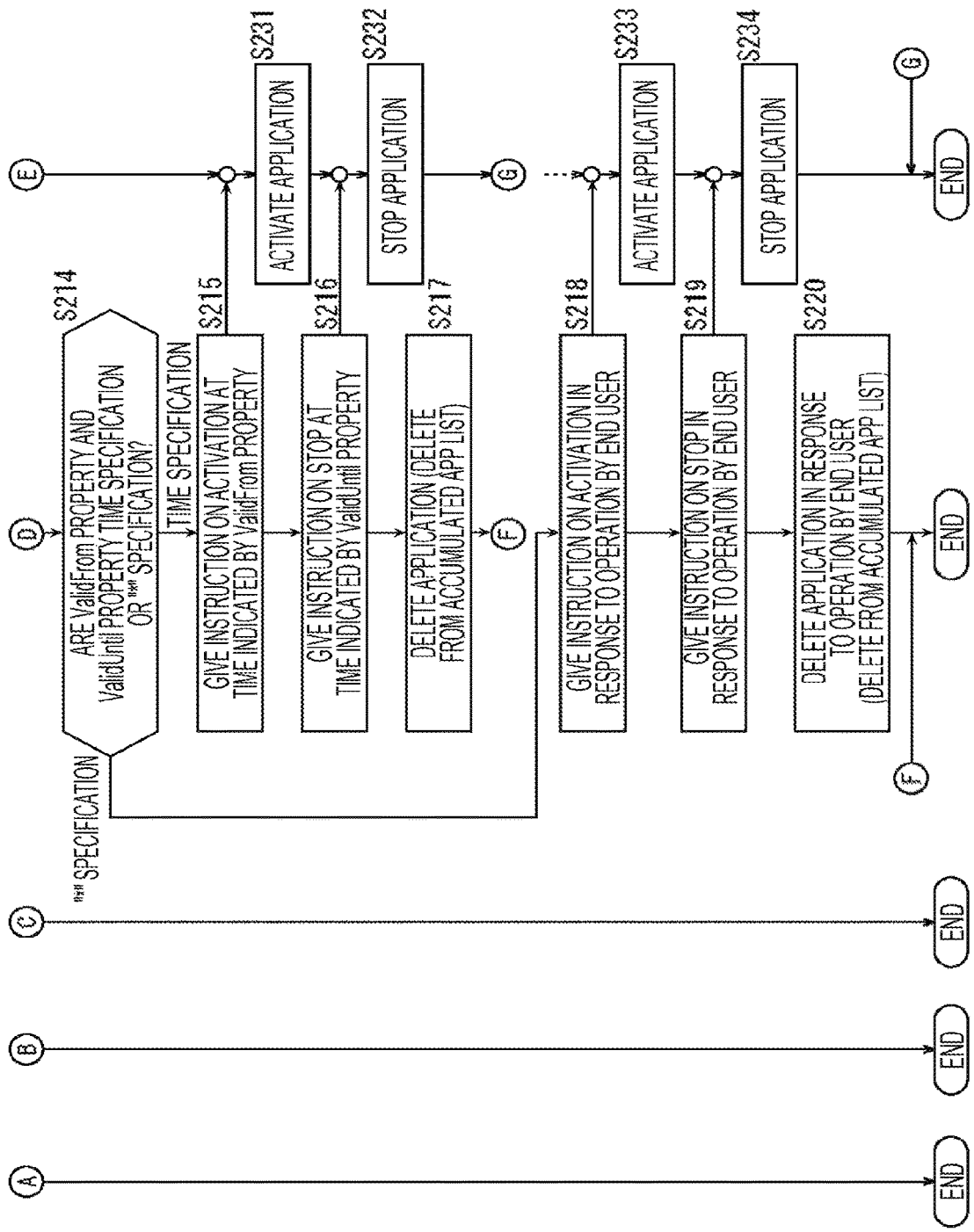
FIG. 8 is a flowchart explaining a flow of the application corresponding process.

The processes in steps S211 to 220 in FIGS. 7 and 8 are executed by the broadcast middleware 205 of the client device 20 and the processes in steps S231 to S234 in FIG. 8 are executed by the browser 209 of the client device 20. In the receiving unit 204 of the client device 20, the broadcast wave transmitted from the broadcast server 105 is received.

In step S211, the broadcast middleware 205 processes signaling obtained from the multiplexed stream. Here, as signaling, LLS or SLS is obtained and processed. For example, the broadcast middleware 205 parses the HLST metadata transmitted as SLS in the ROUTE session and performs a process related to the application according to an analysis result. Note that the broadcast middleware 205 can obtain the EFDT according to the analysis result of the S-TSID metadata transmitted by the ROUTE session.

In step S212, in a case where the analysis result of the HLST metadata indicates timing to obtain the application, the broadcast middleware 205 parses the EFDT transmitted by the ROUTE session and obtains the package file of the application according to the analysis result. The file of the application obtained in this manner is accumulated in the storage 210.

Note that the broadcast middleware 205 manages a list of the accumulated application (accumulated app list) and, in a case where an application is accumulated in the storage 210, information indicating the application (entry location) is added to the accumulated app list. The entry location can be a URL indicating an entry page or the like, for example.

In step S214, the broadcast middleware 205 determines whether the validFrom property and validUntil property are the time specification or "*" specification according to the analysis result of the HLST metadata.

In step S214, in a case where the specifications of the validFrom property and validUntil property are time specifications, the process proceeds to step S215. In step S215, the broadcast middleware 205 instructs the browser 209 so that the application accumulated in the storage 210 is activated at the time indicated by the validFrom property according to the analysis result of the HLST metadata.

In step S231, when it comes to the time indicated by the validFrom property of the HLST metadata, the browser 209 activates the application accumulated in the storage 210 according to the instruction from the broadcast middleware 205. With this arrangement, the application is activated and executed associated with the content.

In step S216, the broadcast middleware 205 instructs the browser 209 so that the activated application is stopped at the time indicated by the validUntil property according to the analysis result of the HLST metadata.

In step S232, the browser 209 stops the activated application at the time indicated by the validUntil property of the HLST metadata, according to the instruction from the broadcast middleware 205.

When the application is stopped in the process in step S232, the process in step S217 is performed. In other words, in step S217, the broadcast middleware 205 deletes the file of the stopped application from the storage 210.

Note that, in this case, the broadcast middleware 205 deletes information indicating the stopped application (entry location) from the accumulated app list.

In a case where the processes in steps S217 and S232 are finished, the application corresponding process in a case where the validFrom property and validUntil property are time specification ends.

On the other hand, in step S214, in a case where the specification of the validFrom property and validUntil property are determined as "*" specification, the process proceeds to step S218. In step S218, the broadcast middleware 205 instructs the browser 209 so that the application stored in the storage 210 is activated in response to an operation by the end user.

In step S233, the browser 209 activates the application accumulated in the storage 210 in a case where the end user gives an instruction on the activation, according to the instruction from the broadcast middleware 205. With this arrangement, the application is activated and executed associated with the content.

In step S219, the broadcast middleware 205 instructs the browser 209 so that the activated application is stopped in response to an operation by the end user.

In step S234, the browser 209 stops the activated application when the end user gives an instruction to stop, according to the instruction from the broadcast middleware 205.

In a case that the application is stopped in the process in step S234, the process in step S220 is performed. In other words, in step S220, the broadcast middleware 205 deletes the file of the stopped application from the storage 210.

Note that, in this case, the broadcast middleware 205 deletes information indicating the stopped application (entry location) from the accumulated app list.

In a case where the processes in steps S220 and S234 are finished, the application corresponding process in a case that the validFrom property and validUntil property are "*" specification ends.

In the above description, the flow of the application corresponding process has been described. In the application corresponding process, in a case where the validFrom property and validUntil property of the HLST metadata is time specification, it becomes a mode (time specification mode) for controlling the operation of the application according to the period of time indicated by the validFrom property and validUntil property and, in a case where the validFrom property and validUntil property are "*" specification, it becomes a mode (user specification mode) for controlling the operation of the application according to intention of the end user. As a result, since the operation of the application can be controlled according to intention of the end user at any time regardless of the period of time specified by the broadcaster, the operation of the application can be more flexibly controlled.

(HLST Metadata Corresponding Process)

Next, with reference to the flowchart of FIG. 9, a flow of the HLST metadata corresponding process executed by the broadcast middleware 205 will be described.

In step S251, the broadcast middleware 205 obtains HLST metadata transmitted as SLS in the ROUTE session.

In step S252, the broadcast middleware 205 starts to parse the HLST metadata obtained in a process in step S251.

In step S253, the broadcast middleware 205 determines whether or not there is an entry location indicated by the analysis result obtained by parsing the HLST metadata (analysis result of the HLST metadata) in the accumulated app list.

In step S253, in a case where it is determined that there is the target entry location in the accumulated app list, since the file of the target application is already accumulated in the storage 210, the process proceeds to step S254.

In step S254, the broadcast middleware 205 determines whether or not there are validFrom property and validUntil property, according to the analysis result of the HLST metadata.

In step S254, in a case where it is determined that there are validFrom property and validUntil property, the process proceeds to step S255. In step S255, the broadcast middleware 205 determines whether the validFrom property and validUntil property are time specification or "*" specification, according to the analysis result of the HLST metadata.

In step S255, in a case where it is determined that the specification of the validFrom property and validUntil property is time specification, the process proceeds to step S256. In step S256, the broadcast middleware 205 accumulates and stops of an application, deletes information in the accumulated app list, according to the time indicated by the validFrom property and validUntil property, for example.

In other words, in the process in step S256, since the broadcast middleware 205 executes processes corresponding to steps S215 to S217 in FIG. 8, processes corresponding to steps S231 to S232 in FIG. 8 are executed and operation of the application is controlled in the browser 209.

Furthermore, in step S255, in a case where it is determined that specification of the validFrom property and validUntil property is "*" specification, the process proceeds to step S257. In step S257, the broadcast middleware 205 activates or stops the application, deletes information in the accumulated app list, or the like in response to an operation by the end user.

In other words, in the process in steps S257, since the processes corresponding to steps S218 to S220 of FIG. 8 are executed by the broadcast middleware 205 and, in the browser 209, the processes corresponding to steps S233 to S234 in FIG. 8 and operation of the application is controlled.

Figure 10:
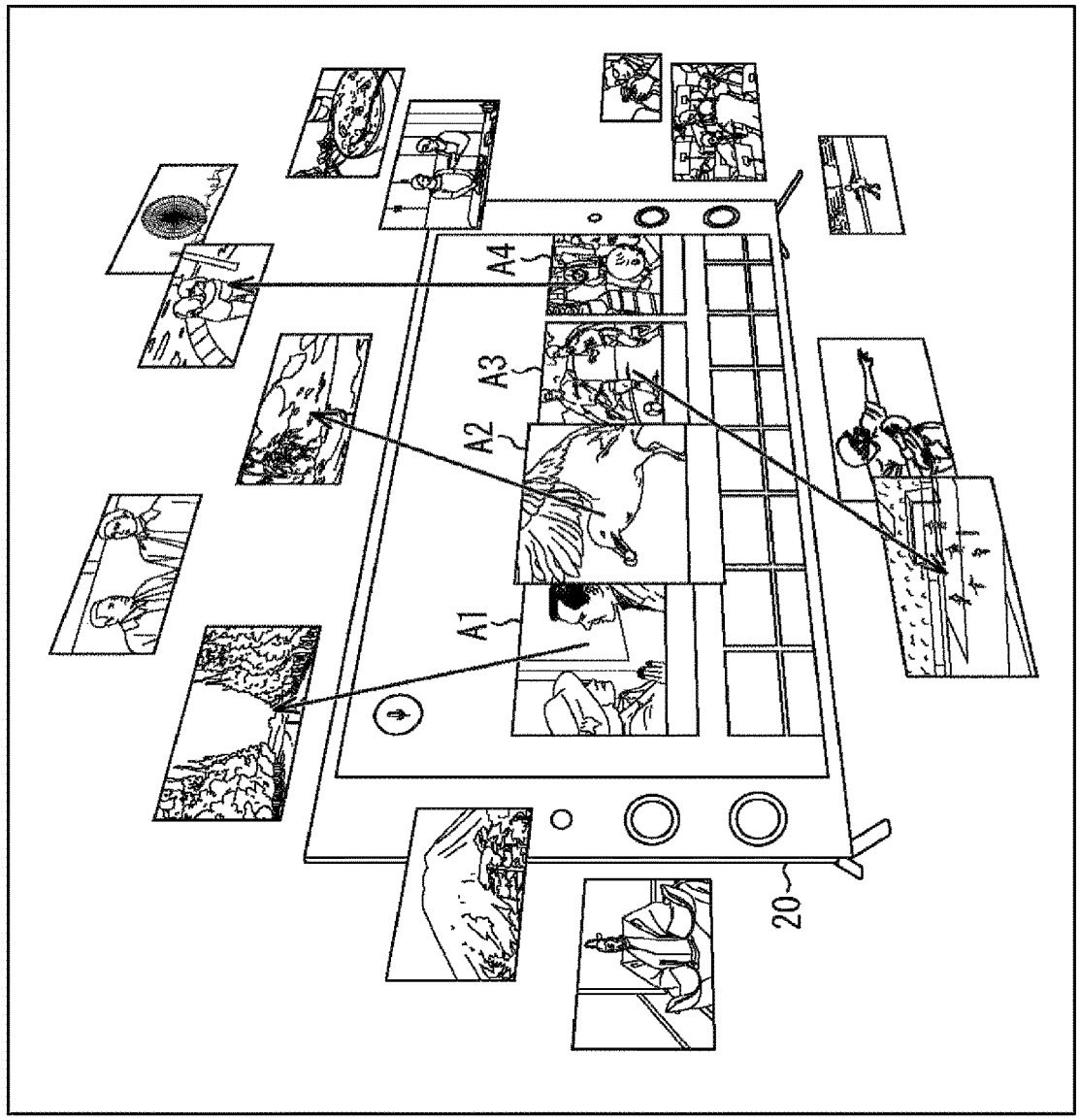
FIG. 10 is a diagram illustrating a display example of icons for activating an application.

Here, for example, as illustrated in FIG. 10, in a case where the client device 20 is a television receiver and the end user activates the client device 20, icons A1 to A4 to activate applications registered in the accumulated app list are displayed on its screen. In other words, in a case where the specification of the validFrom property is "*" specification, the application becomes an application whose operation can be controlled independently from the program and the icons A1 to A4 serve as activation buttons to activate the applications.

As an application of this type, for example, in a case where a program is being broadcasted in series, a catch-up television application or the like that allows a last broadcasted program viewed using a video on demand system via the Internet can be provided. By operating a remote controller, an input unit 202 or the like and selecting one of the icons A1 to A4 for example, the end user can activate an accumulated catch-up television application as indicated by the arrows in FIG. 10 and reproduce a VOD program corresponding to the selected icon.

Figure 11:
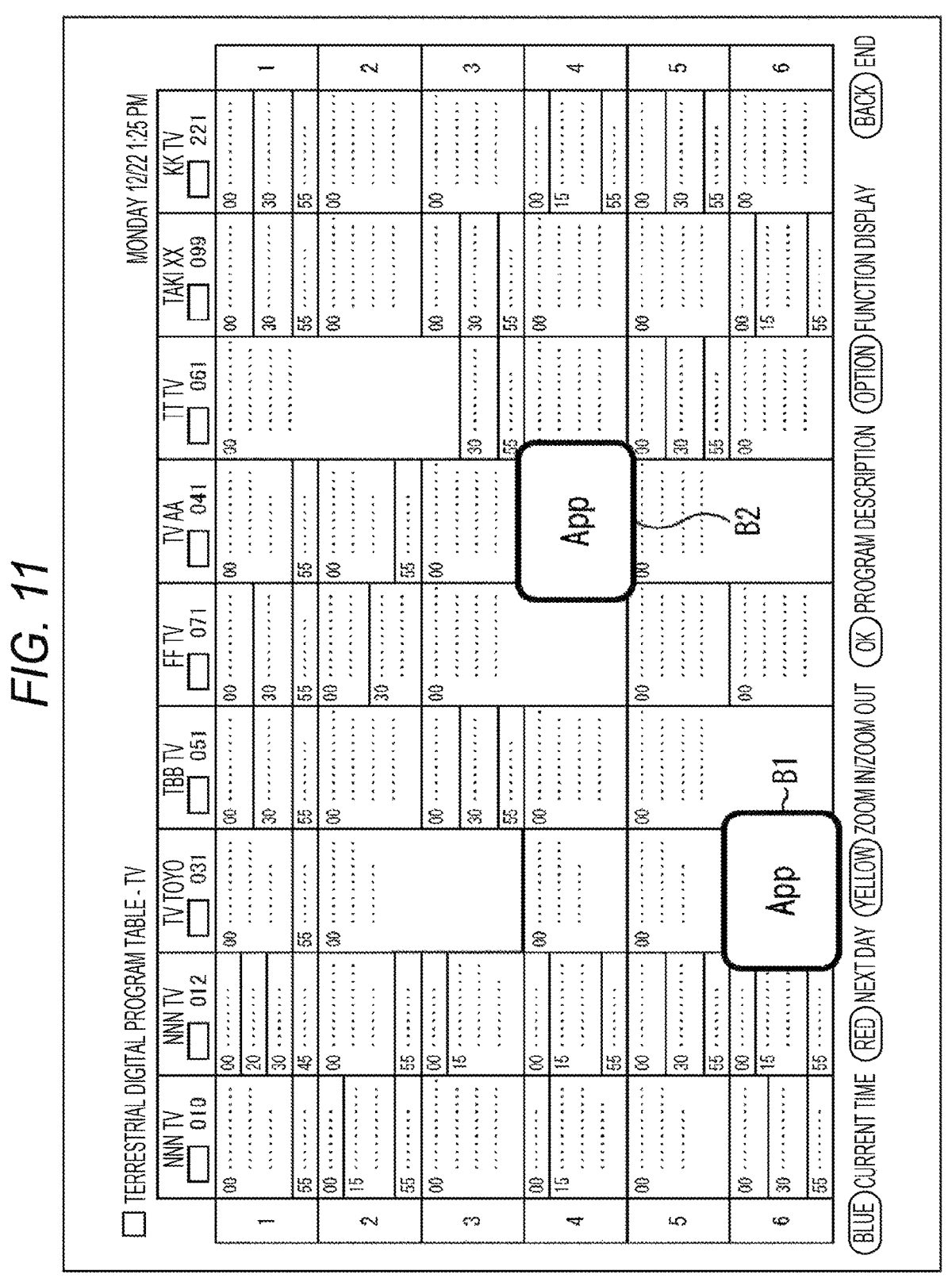

Furthermore, for example, as illustrated in FIG. 11, in a case where the client device 20 is a television receiver, in a case where the end user gives an instruction to activate an electric program table (ESG), an electric program table, which shows information of broadcast programs in a predetermine time zone in each service (channel) is displayed on its screen. In the information of the programs shown in the electric program table, icons B1 and B2 to activate the applications registered in the accumulated app list are superimposed.

As the application of this type, for example, an application or the like, which can control operation related to the content of the program but independently from broadcast time of the program can be provided. The icons B1 and B2 are superimposedly displayed on information of program, which can provide the application, in the electric program table. By operating a remote controller, an input unit 202, and the like for example, and selecting one of the icons B1 and B2, the end user can activate the accumulated catch-up television application and reproduce a VOD program according to the selected icon.

Figure 9:
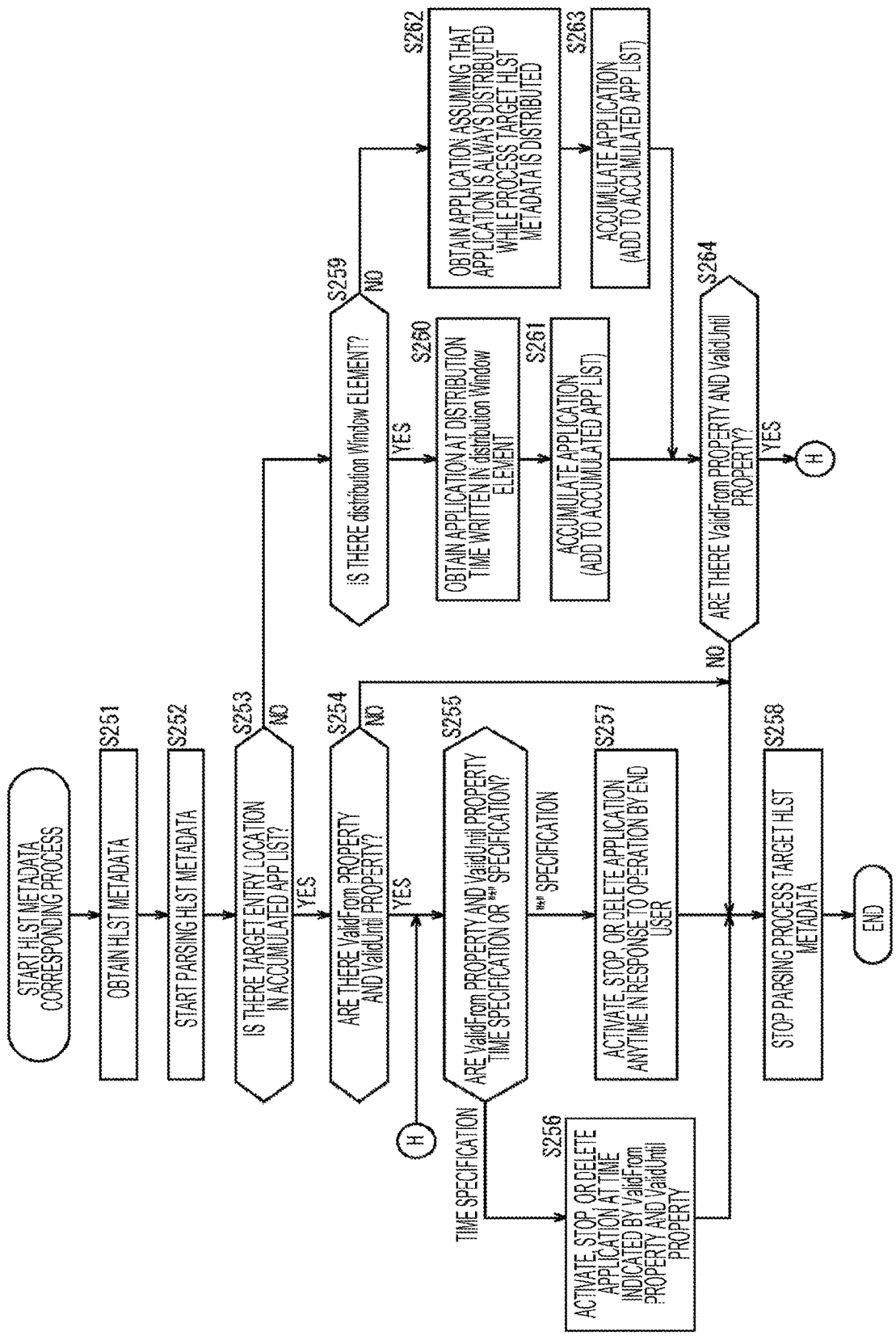
FIG. 9 is a flowchart explaining a flow of an HLST metadata corresponding process.

Back to the description of the flowchart of FIG. 9, when processes in step S256 or S257 end, the process proceeds to step S258. In step S258, the broadcast middleware 205 stops parsing the process target HLST metadata, which is obtained in the process in step S251.

On the other hand, in step S253, in a case where it is determined that there is not the target entry location in the accumulated app list, since the file of the target application is not accumulated in the storage 210, the process proceeds to step S259.

In step S259, the broadcast middleware 205 determines whether or not there is DistributionWindow element, according to the analysis result of the HLST metadata.

In step S259, in a case where it is determined that there is DistributionWindow element, the process proceeds to step S260. In step S260, the broadcast middleware 205 obtains a file of the application (package file) transmitted by the ROUTE session, according to a distribution period defined by time indicated by StartTime element and EndTime element.

In step S261, the broadcast middleware 205 accumulates the file of the application (package file) obtained in a process in step S260 in storage 210. Furthermore, the broadcast middleware 205 adds information indicating the application (entry location) to the accumulated app list.

Furthermore, in step S259, in a case where there is DistributionWindow element, the process proceeds to step S262. In step S262, the broadcast middleware 205 obtains a file of the application (package file) transmitted by the ROUTE session.

In other words, in this case, since there are not StartTime element and EndTime element of DistributionWindow element in the HLST metadata, the broadcast middleware 205 recognizes that the target application is always being distributed when the process target HLST metadata is distributed and the file of the application can be obtained at any timing. For example, in this case, after parsing the HLST metadata, the file of the application can be immediately obtained.

In step S263, as in the case of step S261, the file of the application (package file) obtained in a process in step S262 is accumulated in the storage 210. Furthermore, the information indicating the application (entry location) is added to the accumulated app list.

When the process in step S261 or S263 ends, the process proceeds to step S264. In step S264, the broadcast middleware 205 determines whether or not there is validFrom property and validUntil property according to the analysis result of the HLST metadata.

In step S264, in a case where it is determined that there are validFrom property and validUntil property, the process proceeds to step S255 and the processes in step S255 and subsequent steps are executed. In other words, in a case where the validFrom property and validUntil property are time specification, the operation of the application is controlled according to the time indicated by the validFrom property and validUntil property. On the other hand, in a case where the validFrom property and validUntil property are "*" specification, the operation of the application is controlled at any time in response to an operation by the end user.

Furthermore, in step S264, in a case where it is determined that there are not validFrom property and validUntil property, the process proceeds to step S258. In step S258, the broadcast middleware 205 stops parsing the process target HLST metadata, which is obtained in the process in step S251. In a case where the process in step S258 ends, the HLST metadata corresponding process of FIG. 9 ends.

In this case, it is assumed that the activation time is written in another piece of HLST metadata, which is expected to be received, and the process on the process target HLST metadata is ended. Here, since the corresponding HLST metadata may be missed, the HLST metadata corresponding process is always performed assuming that "*" is specified in the validUntil property. For example, a process for regularly cleaning accumulated applications so that an application remained in the accumulated app list for a long period of time is discarded.

In the above description, the flow of the HLST metadata corresponding process has been described.

(Content Corresponding Process)

Finally, with reference to the flowchart in FIG. 12, a flow of the content corresponding process executed by the transmitting-side system 10 and client device 20 will be described.

Figure 12:
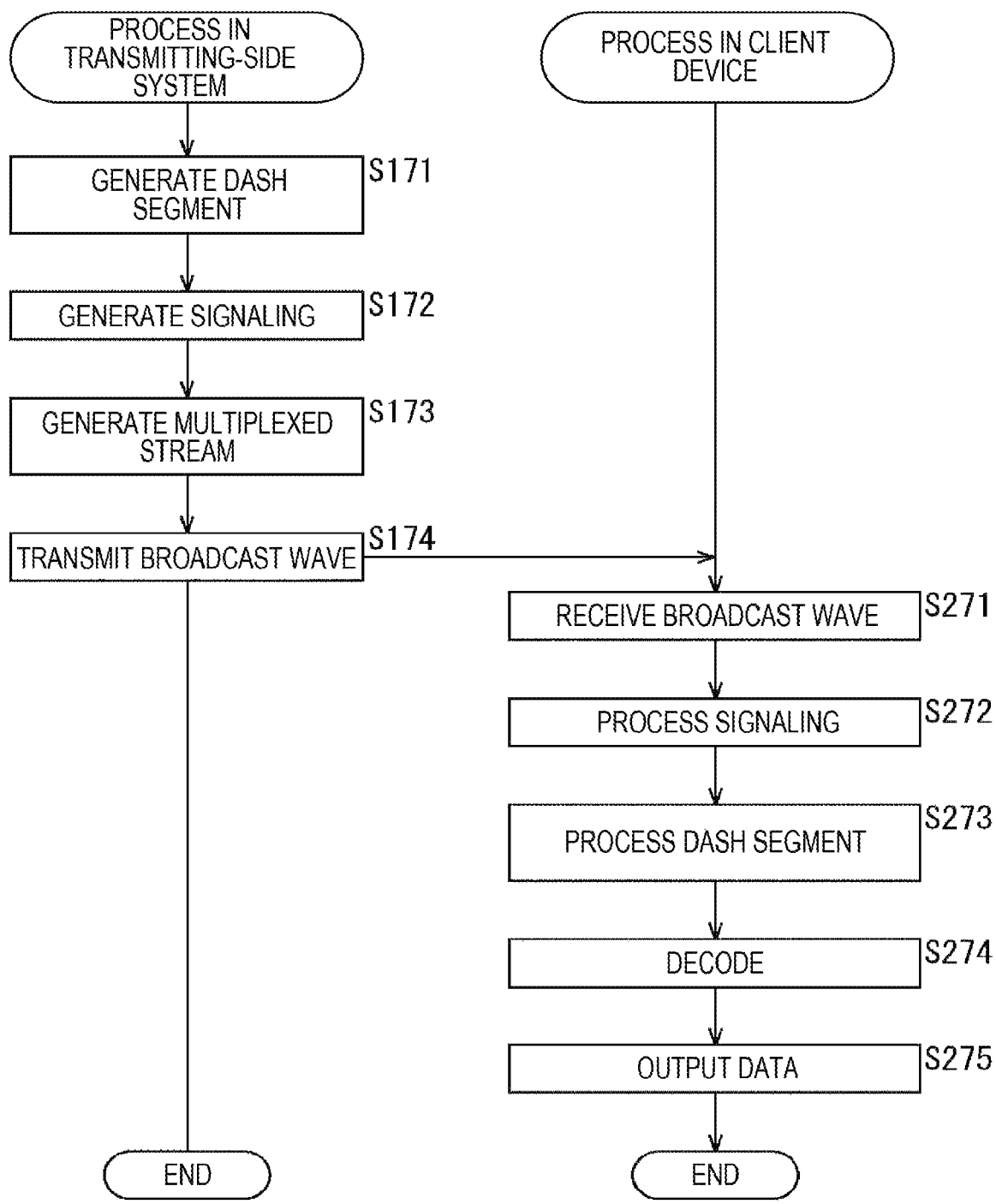
FIG. 12 is a flowchart explaining a flow of a content corresponding process.

Note that, in FIG. 12, the processes in steps S171 to S174 are processes executed by the transmitting-side system 10 and the processes in steps S271 to S275 are processes executed by the client device 20.

In step S171, the DASH server 101 generates a DASH segment file from data of content.

In step S172, the signaling server 102 generates signaling of LLS or SLS. Here, the LLS includes SLT metadata. Furthermore, the SLS includes metadata such as USBD, S-TSID, MPD, and the like.

In step S173, the broadcast server 105 generates a multiplexed stream including the DASH segment file and the file of signaling obtained in the processes in steps S171 to S172.

In step S174, the broadcast server 105 performs a modulation process on the multiplexed stream obtained in the process in step S173 and transmits a broadcast wave obtained as a result via the broadcasting transmission path 30.

In step S271, the receiving unit 204 receives the broadcast wave transmitted from the broadcast server 105 via the broadcasting transmission path 30. Here, the multiplexed stream is obtained by the receiving unit 204 that preforms a modulation process on the broadcast wave.

In step S272, the broadcast middleware 205 processes signaling included in the multiplexed stream obtained in the process in step S271. Here, signaling of LLS or SLS is processed.

In step S273, the DASH client 206 processes the DASH segment file included in the multiplexed stream obtained in the process in step S271, according to the process result obtained in the process in step S272.

In step S274, the decoder 207 decodes data obtained in the process in step S273.

In step S275, the output unit 208 processes the data obtained in the process in step S274 and outputs the data to a display or a speaker. With this arrangement, in the client device 20, content of service corresponding to a channel selection operation by the end user is reproduced.

In the above description, the flow of the content corresponding process has been described.

5. Modification Example (Distribution Via Communication System)

The above described transmission system 1 in FIG. 1 has described a case that the data of content or application is distributed via broadcasting using the broadcasting transmission path 30; however, the data of the content or application may be distributed via communication using a communication transmission path such as the Internet, and the like.

Figure 13:
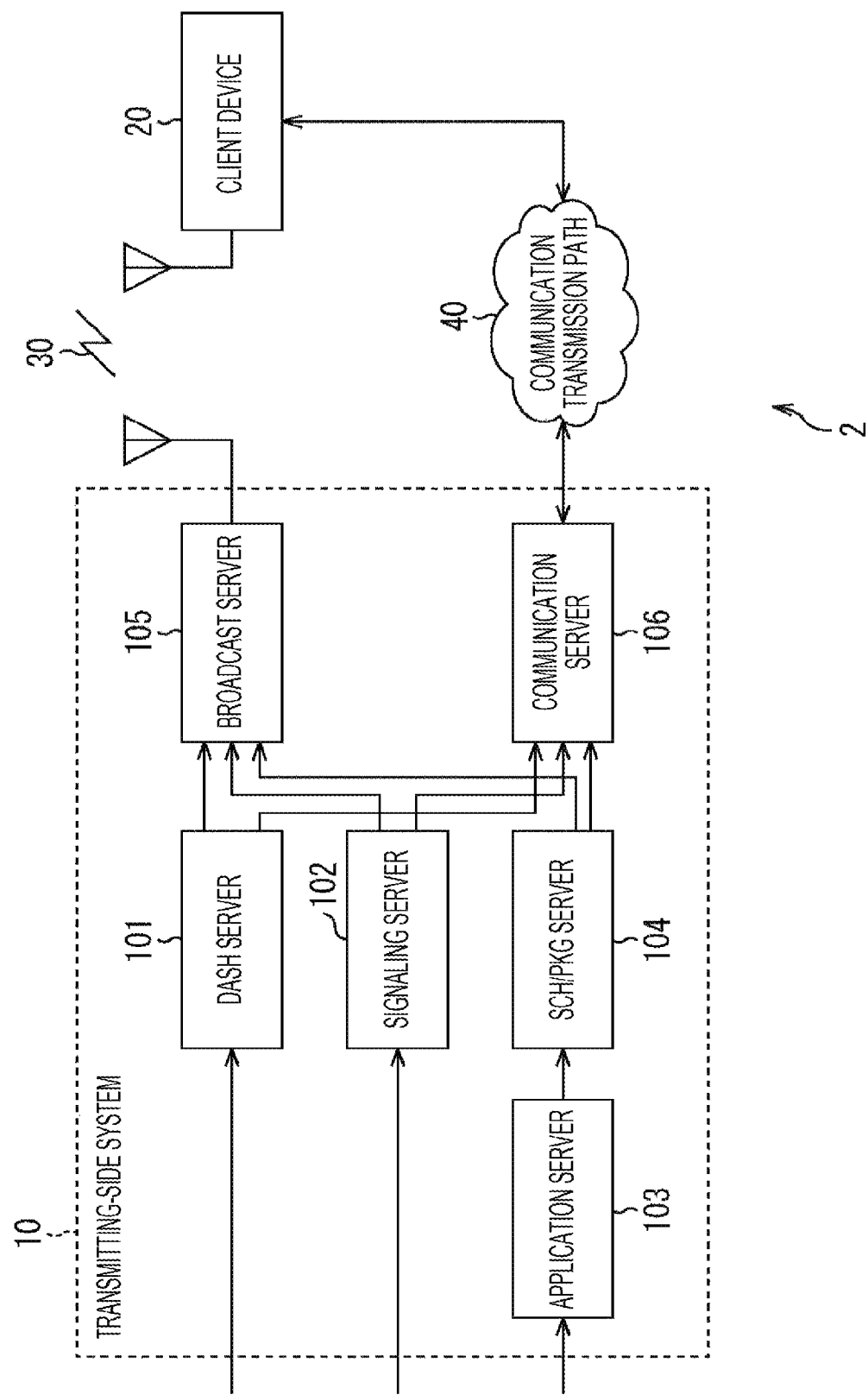
FIG. 13 is a diagram illustrating a configuration example of a transmission system.

FIG. 13 illustrates another configuration example of the transmission system. In the transmission system 2 of FIG. 13, a part that a communication server 106 is provided in addition to the DASH server 101 to broadcast server 105 in the transmitting-side system 10, compared to the transmission system 1 of FIG. 1. Furthermore, the client device 20 has a communication function and is reciprocally connected to communication server 106 via the communication transmission path 40 such as the Internet, and the like.

The communication server 106 receives files since a DASH segment file from the DASH server 101, a signaling (SLS) file from the signaling server 102, and an application file from the SCH/PKG server 104 are transmitted.

The communication server 106 processes the files from each server. The communication server 106 transmits various files via the communication transmission path 40 in response to a request from the client device 20. Here, as illustrated as the protocol stack of FIG. 3, the files are transmitted using HTTP of TCP/IP protocol.

On the other hand, in a case where a communication function is included, the client device 20 can access the communication server 106 and receive various files via the communication transmission path 40.

For example, the client device 20 can adaptively reproduce content such as a VOD program of stream distribution by receiving and processing the MPD metadata or DASH segment file transmitted from the communication server 106 via the communication transmission path 40.

Furthermore, for example, the client device 20 can execute application obtained via a communication system by receiving and processing the HLST metadata and file of the application transmitted from the communication server 106 via the communication transmission path 40.

Here, also in this example, according to the analysis result obtained by parsing the HLST metadata, in a case of a time specification, it becomes in a time specification mode and the operation of the application is controlled according to the time indicated by the validFrom property and validUntil property and, in a case of a "*" specification, the operation of the application is controlled at anytime in response to an operation by the end user.

Note that the above described description has described that the DASH segment file, signaling file, and application file are distributed using one of a broadcast system via the broadcasting transmission path 30 and a communication system via the communication transmission path 40; however, a part of the files may be distributed via the broadcast system and the rest of the files may be distributed via the communication system. In other words, in the client device 20, an application obtained via the broadcast system or communication system is executed associated with the content obtained via the broadcast system or communication system.

Furthermore, for example, in the SLS file, metadata such as USBD, S-TSID, and the like may be distributed via a broadcast system, and metadata such as HLST, MPD, and the like may be distributed via a communication system. Furthermore, for example, in the application file, an entry page file such as a document file or the like may be distributed via a broadcast system and a resource file such as an image file, a script file, or the like may be distributed via a communication system.

(Applying to Another Broadcasting Standard)

The above description has described, as a standard of digital broadcasting, ATSC (especially, ATSC 3.0), which is a scheme used in the United States of America and the like; however, the present technology may be applied to Integrated Services Digital Broadcasting (ISDB), which is a scheme used in Japan and the like, or Digital Video Broadcasting (DVB), which is a scheme used in countries in Europe and the like, for example.

Furthermore, the above description has described an example in which ATSC 3.0 using an IP transmission scheme is employed; however, in addition to the IP transmission scheme, for example, another scheme such as MPEG2-Transport Stream (TS) scheme and the like may be employed. Furthermore, as the standard of digital broadcasting, in addition to terrestrial broadcasting, satellite broadcasting using broadcasting satellite (BS), communications satellite (CS), and the like, or wire broadcasting such as cable television (CATV) and the like may be employed.

(Another Example of Application)

Furthermore, in the above description, the application associated with the content is not limited to an application developed with a markup language such as HTML5 and the like or a script language such as JavaScript (registered trademark) and the like and may be an application developed with a programming language such as Java (registered trademark) and the like, for example. Furthermore, the application is not limited to an application executed by a browser and may be a so-called native application, which is executed in an operating system (OS) environment.

Here, the application may be made to operate without being displayed (in background) in addition to expressly displaying some information (may be activated without being recognized by the end user). Furthermore, the content associated with an application may include various content such as an electronic book, a game, advertising, and the like for example, in addition to a moving image and music.

Furthermore, the above description has described an example of a case that a file composing an application is stored in a package file and transmitted; however, the file composing the application may be transmitted as an individual file (an independent file) in an NRT channel without being stored in the package file. In this case, in the EFDT, as a transfer parameter, information for identifying individual files transmitted in the NRT channel are included (an individual TOI is allocated to each individual file).

Another Modification Example

The names of the above described signaling, packet, and the like are examples and other names are used in some cases. Here, the differences of the names are formal differences and do not make changes in substantial content of the corresponding signaling, packet, and the like. For example, User Service Bundle Description (USBD) is referred to as User Service Description (USD) or the like in some cases. Furthermore, for example, Non Real Time (NRT) content is referred to as Locally Cached Content (LCC) or the like, and an application information table (AIT) is referred to as an application signaling table (AST) or the like, in some cases. Furthermore, Electronic Service Guide (ESG) is referred to as Electronic Program Guide (EPG) or the like in some cases.

Furthermore, to simplify the description, in the transmission system 1 of FIG. 1 and the transmission system 2 of FIG. 13, a configuration in which the broadcast server 105 of the broadcaster independently includes a multiplexor and a modulator has been described; however, in a general digital broadcasting system, the multiplexor and modulator are provided in a different place. For example, the multiplexor is placed in the broadcaster and the modulator is placed in the transmitting station (transmitter). Furthermore, the entire of the transmitting-side system 10 of FIG. 1 and transmission system 2 of FIG. 13 may be considered as a single device, which includes function of each server.

6. Configuration of Computer

Figure 14:
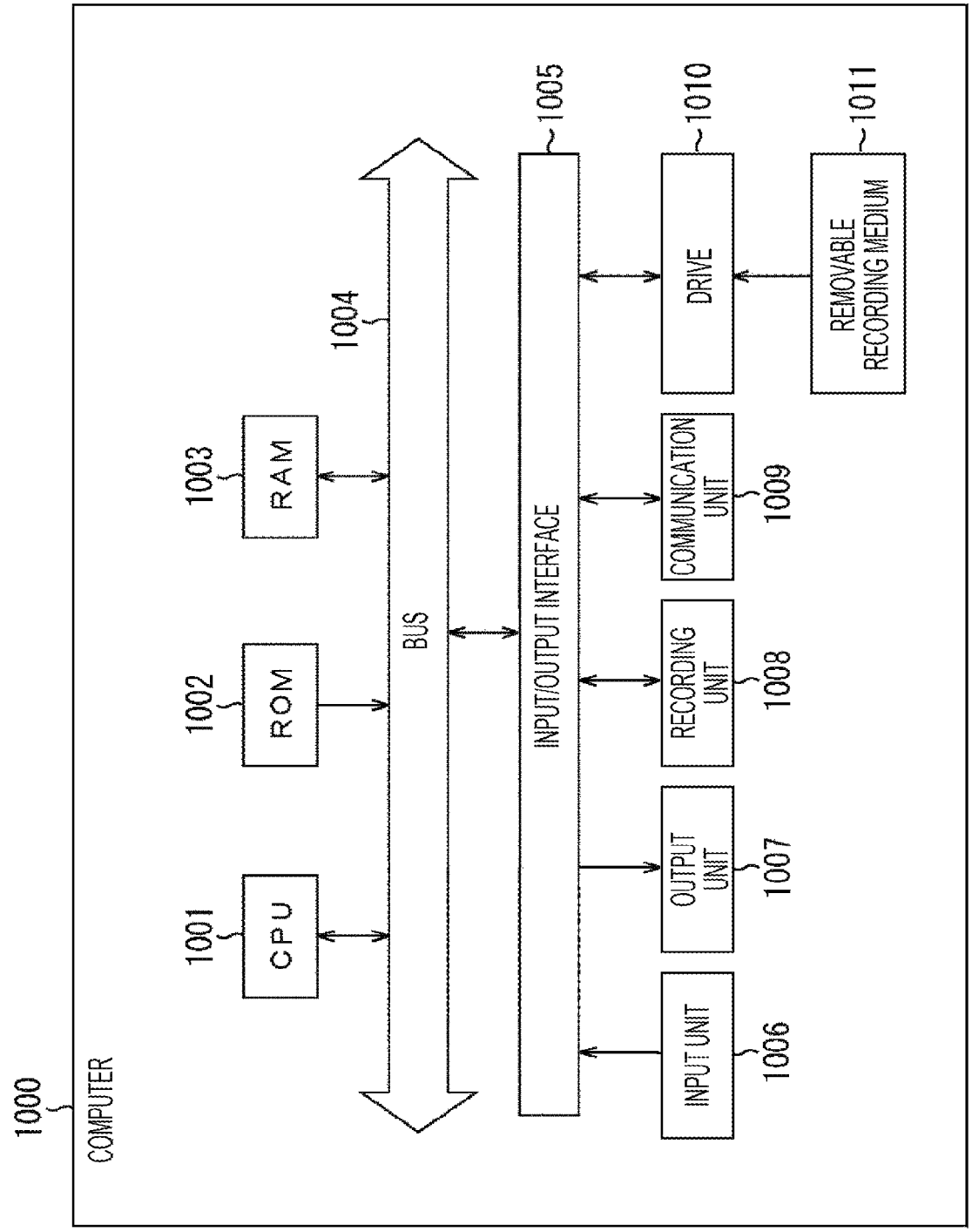
FIG. 14 is a diagram illustrating a configuration example of a computer.

The above described series of processes (the application corresponding process or content corresponding process, for example) may be executed with hardware and may be executed with software. In a case where the series of processes is executed with software, a program composing the software is installed in a computer. FIG. 14 is a diagram illustrating a configuration example illustrating hardware of the computer, which executes the above described series of processes with the program.

In a computer 1000, a central processing unit (CPU) 1001, a read only memory (ROM) 1002, and a random access memory (RAM) 1003 are connected one another via a bus 1004. To the bus 1004, an input/output interface 1005 is further connected. To the input/output interface 1005, an input unit 1006, an output unit 1007, a storage unit 1008, a communication unit 1009, and a drive 1010 are connected.

The input unit 1006 includes a keyboard, a mouse, a microphone, or the like. The output unit 1007 includes a display, a speaker, or the like. The storage unit 1008 includes a hard disk, a non-volatile memory, or the like. The communication unit 1009 includes a network interface or the like. The drive 1010 drives a removable recording medium 1011 such as a magnetic disk, an optical disk, a magnetic optical disk, a semiconductor memory, and the like.

In the computer 1000 composed as described above, the above described series of processes are performed by that the CPU 1001 loading the program recorded in the ROM 1002 or storage unit 1008 to the RAM 1003 via the input/output interface 1005 or bus 1004 and executing the program.

The program executed by the computer 1000 (CPU 1001) can be recorded and provided in the removable recording medium 1011, which is a portable medium and the like, for example. Furthermore, the program can be provided via a wired or wireless transmission medium such as a local area network, the Internet, or digital satellite broadcasting.

To the computer 1000, the program can be installed in the storage unit 1008 via the input/output interface 1005 by attaching the removable recording medium 1011 to the drive 1010. Furthermore, the program can be received by the communication unit 1009 via the wired or wireless transmission medium and be installed to the storage unit 1008. In addition, the program can be installed in the ROM 1002 or storage unit 1008 in advance.

Here, the processes that the computer performs according to the program in this specification may not always have to be performed in chronological order according to the order described as the flowchart. In other words, the processes that the computer performs according to the program include processes executed in parallel or individually (for example, parallel processing or processing by an object). Furthermore, the program may be processed by a single computer (processor) or may be distributedly processed by a plurality of computers.

Note that the embodiment of the present technology is not limited to the above described embodiments and various changes can be made within a scope of the present technology.

Furthermore, the present technology may be composed as follows.

(1)

A receiving device including a receiving unit configured to receive content, and a control unit configured to control operation of an application associated with the content on the basis of effective period information indicating a period in which the application becomes effective, in which the effective period information can specify one of a first mode for controlling operation of the application according to the period and a second mode for controlling the operation of the application according to intention of an end user, and the control unit controls the operation of the application according to an operation by the end user in a case where the second mode is specified as the effective period information.

(2)

The receiving device according to (1), in which the control unit controls so that the application is activated associating with the content only during the period in a case where the first mode is specified in the effective period information, and controls so that the application is activated or stopped in response to an operation by the end user in a case where the second mode is specified in the effective period information.

(3)

The receiving device according to (1) or (2), in which the application includes one or more files, and the effective period information includes first start time information indicating start time of a period that a target page obtained from the file becomes effective and first end time information indicating end time of the period that the target page obtained from the file becomes effective.

(4)

The receiving device according to (3), in which in a case where a predetermined certain keyword is specified for time information of at least one of the first start time information or the first end time information in the effective period information, it is assumed that the second mode is specified.

(5)

The receiving device according to any one of (1) to (4), in which the control unit controls so that the application is obtained on the basis of acquisition period information indicating a period that the application becomes available.

(6)

The receiving device according to (5), in which the application includes one or more files, and the acquisition period information includes second start time information indicating start time of the distribution period of the file and second end time information indicating end time of the distribution period of the file.

(7)

The receiving device according to (5) or (6), in which the control unit controls so that the application is obtained in an arbitrary period in a case where there is no acquisition period information.

(8)

The receiving device according to (5), in which the effective period information and the acquisition period information are included in control information for controlling the application, which is provided for each service, and the receiving unit receives the control information transmitted together with the content.

(9)

The receiving device according to (8), in which a single piece of the control information is information for associating the single application with the single content.

(10)

A data processing method of a receiving device, the method including steps, by the receiving device, of receiving content, and controlling activation of an application on the basis of effective period information indicating a period in which the application associated with the content becomes effective, in which the effective period information can specify one of a first mode for controlling operation of the application according to the period and a second mode for controlling the operation of the application according to intention of an end user, and in a case where the second mode is specified as the effective period information, the operation of the application is controlled according to an operation by the end user.

(11)

A transmitting device including a generating unit configured to generate effective period information which indicates a period in which an application associated with content becomes effective and can specify one of a first mode for controlling operation of the application according to the period and a second mode for controlling the operation of the application according to intention of an end user, and a transmitting unit configured to transmit the effective period information together with the content.

(12)

The transmitting device according to (11), in which the effective period information is information for activating the application as associating with the content only in the period in a case where the first mode is specified, and information for activating or stopping the application in response to an operation by the end user in a case where the second mode is specified.

(13)

The transmitting device according to (11) or (12), in which the application includes one or more files, and the effective period information includes first start time information indicating start time of a period in which a target page obtained from the file becomes effective and first end time information indicating end time of the period in which the target page obtained from the file becomes effective.

(14)

The transmitting device according to (13), in which the generating unit specifies a predetermined certain keyword in time information of at least one of the first start time information or the first end time information in a case where the second mode is specified.

(15)

The transmitting device according to any one of (11) to (14), in which the generating unit generates acquisition period information indicating a period that the application becomes available, and the transmitting unit transmits the acquisition period information.

(16)

The transmitting device according to (15), in which the application includes one or more files, the acquisition period information includes second start time information indicating start time of a distribution period of the file and second end time information indicating end time of the distribution period of the file.

(17)

The transmitting device according to (15) or (16), in which the generating unit generates the effective period information and the acquisition period information as included in control information for controlling the application, which is provided for each service, and the transmitting unit transmits the control information together with the content.

(18)

The transmitting device according to (17), in which the generating unit includes only the effective period information in the control information in a case where the application is made available in an arbitrary period.

(19)

The transmitting device according to (17) or (18), in which a single piece of the control information is information for associating the single application with the single content.

(20)

A data processing method of a transmitting device, the method including steps, by the transmitting device, of generating effective period information, which indicates a period in which an application associated with content becomes effective and can specify one of a first mode for controlling operation of the application according to the period and a second mode for controlling the operation of the application according to intention of the end user, and transmitting the effective period information together with the content.

REFERENCE SIGNS LIST 1, 2 Transmission system
10 Transmitting-side system
20 Client device
30 Broadcasting transmission path
40 Communication transmission path
101 DASH server
102 Signaling server
103 Application server
104 SCH/PKG server
105 Broadcast server
106 Communication server
201 Control unit
202 Input unit
203 Memory
204 Receiving unit
205 Broadcast middleware
206 DASH client
207 Decoder
208 Output unit
209 Browser
210 Storage
1000 Computer
1001 CPU

The invention claimed is:

1. A receiving device comprising:
circuitry configured to
receive content; and
control an application associated with the content based on effective period information indicating a period in which the application becomes effective, wherein
the effective period information specifies a first mode or a second mode,
the application is controlled according to the period in a case that the effective period information specifies the first mode, and
the application is controlled according to an operation of an end user in a case that the effective period information specifies the second mode.

2. The receiving device according to claim 1, wherein the circuitry is configured to control the application to activate in association with the content only during the period in the case that the first mode is specified in the effective period information, and control the application to activate or stop in response to the operation by the end user in the case that the second mode is specified in the effective period information.

3. The receiving device according to claim 2, wherein the application includes one or more files, and the effective period information includes first start time information indicating start time of the period that a target page obtained from the file becomes effective and first end time information indicating end time of the period that the target page obtained from the file becomes effective.

4. The receiving device according to claim 3, wherein in a case that a certain keyword is specified for time information of at least one of the first start time information or the first end time information in the effective period information, the second mode is determined to be specified.

5. The receiving device according to claim 2, wherein the circuitry is configured to obtain the application based on acquisition period information indicating a distribution period that the application becomes available.

6. The receiving device according to claim 5, wherein the application includes one or more files, and the acquisition period information includes second start time information indicating start time of the distribution period of the file and second end time information indicating end time of the distribution period of the file.

7. The receiving device according to claim 5, wherein the that circuitry is configured to obtain the application according to any timing in a case that there is no acquisition period information.

8. The receiving device according to claim 5, wherein the effective period information and the acquisition period information are included in control information for controlling the application, which is provided for each service, and the circuitry is configured to receive the control information transmitted with the content.

9. The receiving device according to claim 8, wherein a single piece of the control information is information for associating the single application with the single content.

10. A data processing method of a receiving device, the method comprising:

receiving content; and controlling, by circuitry of the receiving device, an application associated with the content based on effective period information indicating a period in which the application becomes effective, wherein the effective period information specifies a first mode or a second mode, the application is controlled according to the period in a case that the effective period information specifies the first mode, and the application is controlled according to an operation of an end user in a case that effective period information specifies the second mode.

11. A transmitting device comprising:
    circuitry configured to
    generate effective period information which indicates a period in which an application associated with content becomes effective, the effective period information specifying a first mode or a second mode; and
    transmit the effective period information and the content, wherein
    the application is controlled according to the period in a case that the effective period information specifies the first mode, and
    the application is controlled according to an operation of an end user in a case that the effective period information specifies the second mode.

12. The transmitting device according to claim 11, wherein
    the application is activated in association with the content only in the period in the case that the first mode is specified, and
    the application is activated or stopped in response to the operation by the end user in the case that the second mode is specified.

13. The transmitting device according to claim 12, wherein
    the application includes one or more files, and
    the effective period information includes first start time information indicating start time of the period in which a target page obtained from the file becomes effective and first end time information indicating end time of the period in which the target page obtained from the file becomes effective.

14. The transmitting device according to claim 13, wherein the circuitry is configured to
    specify a certain keyword in time information of at least one of the first start time information or the first end time information in the case that the second mode is specified.

15. The transmitting device according to claim 12, wherein the circuitry is configured to
    generate acquisition period information indicating a distribution period that the application becomes available, and
    transmit the acquisition period information.

16. The transmitting device according to claim 15, wherein
    the application includes one or more files, and
    the acquisition period information includes second start time information indicating start time of the distribution period of the file and second end time information indicating end time of the distribution period of the file.

17. The transmitting device according to claim 15, wherein the circuitry is configured to
    generate the effective period information and the acquisition period information as included in control information for controlling the application, which is provided for each service, and
    transmit the control information with the content.

18. The transmitting device according to claim 17, wherein the circuitry is configured to
    include only the effective period information in the control information in a case that the application is to be obtained according to any timing.

19. The transmitting device according to claim 17, wherein
    a single piece of the control information is information for associating the single application with the single content.

20. A data processing method of a transmitting device, the method comprising:
    generating, by circuitry of the transmitting device, effective period information, which indicates a period in which an application associated with content becomes effective, the effective period information specifying a first mode or a second mode; and
    transmitting the effective period information with the content, wherein
    the application is controlled according to the period in a case that the effective period information specifies the first mode, and
    the application is controlled according to an operation of an end user in a case that the effective period information specifies the second mode.

* * * * *